United States Patent
Kim et al.

(10) Patent No.: US 11,950,190 B2
(45) Date of Patent: Apr. 2, 2024

(54) ELECTRONIC DEVICE, AND METHOD FOR REDUCING SELF-INTERFERENCE DUE TO DUAL UPLINK OPERATION

(71) Applicant: Samsung Electronics Co., Ltd., Suwon-si (KR)

(72) Inventors: Junsuk Kim, Suwon-si (KR); Hongju Park, Suwon-si (KR); Sangho Lee, Suwon-si (KR); Taelee Lee, Suwon-si (KR); Taeseop Lee, Suwon-si (KR); Wonsuk Chung, Suwon-si (KR); Suyoung Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 371 days.

(21) Appl. No.: 17/413,344

(22) PCT Filed: Oct. 28, 2019

(86) PCT No.: PCT/KR2019/014304
§ 371 (c)(1),
(2) Date: Jun. 11, 2021

(87) PCT Pub. No.: WO2020/138683
PCT Pub. Date: Jul. 2, 2020

(65) Prior Publication Data
US 2022/0046553 A1    Feb. 10, 2022

(30) Foreign Application Priority Data

Dec. 26, 2018 (KR) .......................... 10-2018-0169850

(51) Int. Cl.
*H04W 52/24* (2009.01)
*H04W 72/02* (2009.01)
(Continued)

(52) U.S. Cl.
CPC ......... *H04W 52/245* (2013.01); *H04W 72/02* (2013.01); *H04W 72/541* (2023.01); *H04W 88/06* (2013.01); *H04W 74/08* (2013.01)

(58) Field of Classification Search
CPC ........... H04W 72/541; H04W 72/0453; H04W 72/53; H04W 76/18; H04W 52/245; H04W 16/14
(Continued)

(56) References Cited

U.S. PATENT DOCUMENTS 6,223,056 B1 * 4/2001 Appel ................... H03F 1/0261
                                                                        455/127.1
9,166,763 B2 * 10/2015 Sagae .................. H04B 1/0475
(Continued)

FOREIGN PATENT DOCUMENTS

JP       6140479 B2     5/2017
JP       6432104 B2    12/2018
(Continued)

OTHER PUBLICATIONS

J. Jeon, "NR Wide Bandwidth Operations," in IEEE Communications Magazine, vol. 56, No. 3, pp. 42-46, Mar. 2018, doi: 10.1109/MCOM.2018.1700736. (Year: 2018).*

*Primary Examiner* — William D Cumming
(74) *Attorney, Agent, or Firm* — Jefferson IP Law, LLP

(57) ABSTRACT

To perform a first communication with a first base station through the first communication circuit by using a first frequency band, perform a second communication with a second base station through the second communication circuit by using a second frequency band, determine whether the first communication interferes with the second communication, and transmit, to the second base station for the second communication on the basis of the determination result, a request for using a third frequency band, which is different from the second frequency band in at least one from
(Continued)

among bandwidth, center frequency, or sub-carrier spacing (SCS). Other various embodiments are possible.

12 Claims, 14 Drawing Sheets

(51) Int. Cl.
*H04W 72/541* (2023.01)
*H04W 74/08* (2009.01)
*H04W 88/06* (2009.01)

(58) Field of Classification Search
USPC ...... 455/127.1, 445; 370/312, 328, 329, 278
See application file for complete search history.

(56) References Cited

U.S. PATENT DOCUMENTS

| | | | | |
|---|---|---|---|---|
| 9,203,572 | B2* | 12/2015 | Desai | H04W 72/541 |
| 9,467,865 | B2* | 10/2016 | Joshi | H04L 1/00 |
| 9,832,779 | B2* | 11/2017 | Desai | H04J 11/0056 |
| 9,883,545 | B2* | 1/2018 | Seo | H04W 76/18 |
| 9,900,894 | B2* | 2/2018 | Jung | H04W 72/53 |
| 10,009,861 | B2* | 6/2018 | Damnjanovic | H04W 56/001 |
| 10,292,171 | B2* | 5/2019 | Kobayashi | H04W 72/541 |
| 2004/0102222 | A1* | 5/2004 | Skafidas | H04W 16/14 |
| | | | | 455/445 |
| 2013/0279355 | A1 | 10/2013 | Sadek et al. | |
| 2014/0050161 | A1 | 2/2014 | Konuskan et al. | |
| 2014/0286201 | A1* | 9/2014 | Sagae | H04B 1/0475 |
| | | | | 370/278 |
| 2014/0328192 | A1* | 11/2014 | Barriac | H04J 1/16 |
| | | | | 370/312 |
| 2014/0341108 | A1* | 11/2014 | Desai | H04L 5/0073 |
| | | | | 370/328 |
| 2015/0334575 | A1* | 11/2015 | Joshi | H04L 1/00 |
| | | | | 370/329 |
| 2016/0050679 | A1* | 2/2016 | Desai | H04W 72/0453 |
| | | | | 375/132 |
| 2016/0105858 | A1* | 4/2016 | Damnjanovic | H04W 56/001 |
| | | | | 370/329 |
| 2017/0118759 | A1 | 4/2017 | Choi et al. | |
| 2017/0273090 | A1* | 9/2017 | Jung | H04M 1/026 |
| 2018/0026776 | A1 | 1/2018 | Lee | |
| 2018/0092142 | A1 | 3/2018 | Han et al. | |
| 2018/0338308 | A1 | 11/2018 | Park et al. | |
| 2019/0014522 | A1* | 1/2019 | Saga | H04W 36/20 |
| 2019/0182841 | A1* | 6/2019 | Soldati | H04W 72/0453 |
| 2022/0046553 | A1* | 2/2022 | Kim | H04B 17/318 |
| 2022/0140982 | A1* | 5/2022 | An | H04W 24/10 |
| | | | | 370/329 |

FOREIGN PATENT DOCUMENTS

| | | |
|---|---|---|
| KR | 10-1617046 B1 | 5/2016 |
| KR | 10-1659692 B1 | 9/2016 |
| KR | 10-2017-0046443 A | 5/2017 |
| KR | 10-2018-0010966 A | 1/2018 |
| KR | 10-2018-0060181 A | 6/2018 |
| WO | WO-2020138683 A1 * | 7/2020 .......... H04W 52/245 |

* cited by examiner

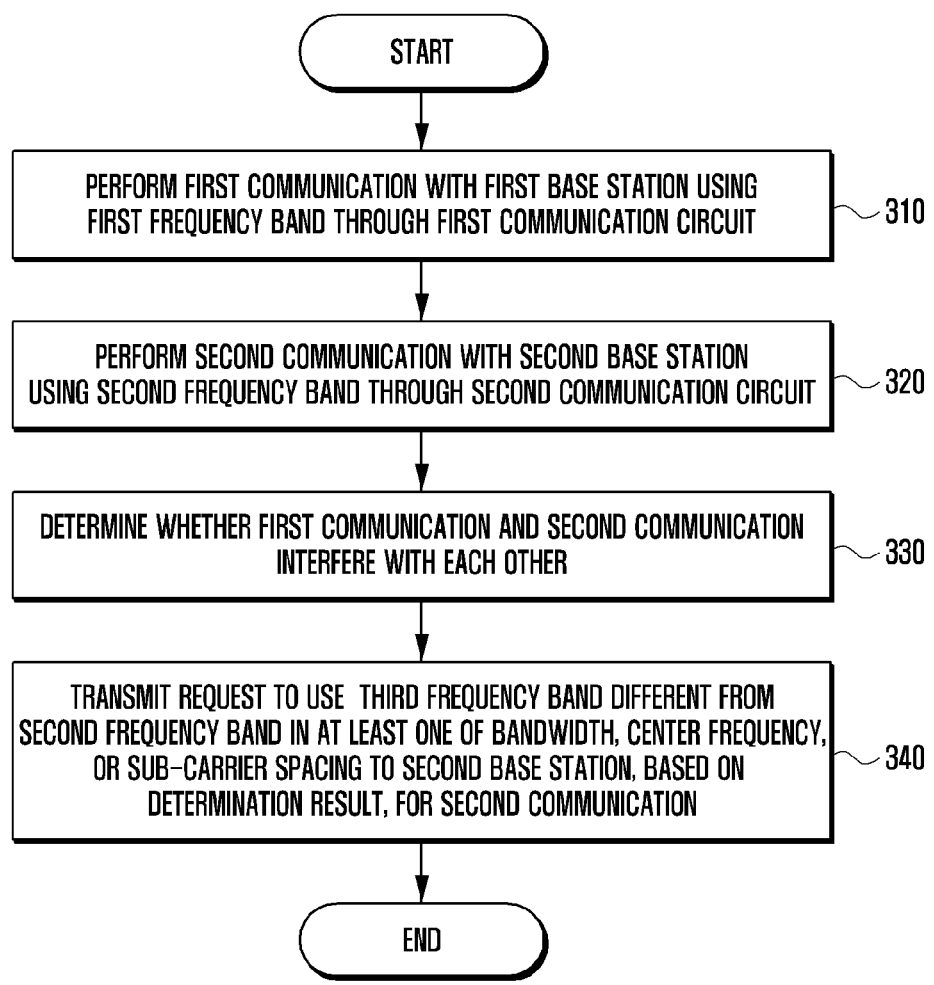

ELECTRONIC DEVICE, AND METHOD FOR REDUCING SELF-INTERFERENCE DUE TO DUAL UPLINK OPERATION

TECHNICAL FIELD

Various embodiments of the disclosure relate to an electronic device and a method for reducing self-interference due to a dual uplink operation.

BACKGROUND ART

There has been widespread use of various types of electronic devices including mobile communication terminals, smartphones, tablet personal computers, laptop computers, wearable devices, digital cameras, personal computers, and Internet-of-Things (IoT) devices.

Technologies for enabling super-high-speed wireless communication of a large amount of data by using such electronic devices have recently appeared. For example, 5th-generation (5G) communication systems or pre-5G communications have appeared to satisfy wireless data traffic demands that are increasing after commercialization of 4th-generation (4G) communication systems.

In the case of a new radio (NR) base station using a millimeter wave (mmWave) frequency band which is additionally considered as a 5G communication band, the same is appropriate for a broadband high-speed service, but the small cell radius and susceptibility to path loss may cause many restrictions. Therefore, a dual connectivity (DC) utilization technology (for example, non-stand alone (NSA)) has appeared to compensate for the same by using a legacy base station (for example, a LTE base station) or a legacy band 5G base station (for example, a 5G base station using a 6 GHz band or less).

In the case of a normal communication system, an electronic device communicates while being connected to a single base station inside a single system. If the DC utilization technology is used, on the other hand, an electronic device may communication while being simultaneously connected to a legacy base station (for example, eNB) and an NR base station (for example, gNB).

DISCLOSURE OF INVENTION

Technical Problem

According to the DC utilization technology, when an electronic device supports multiple frequency band combinations (BC), the user may perform uplink transmission by using two or more frequency bands. For example, the electronic device may perform a dual uplink operation (DUO).

When the DUO is performed, self-interference may occur in a downlink band using an identical or a different frequency band as a result of harmonic and/or inter-modulation distortion (IMD).

The harmonic may refer to an unintended interference signal occurring in a multiple frequency of the fundamental frequency used by the transmitting end, for example.

The IMD may refer to an unintended interference signal caused by an inter-modulation (IM) component and/or a reverse intermodulation (RIM) component. The IM component may occur, when two different input frequencies are introduced such that two signals are simultaneously processed, for example, as a combination of the sum of harmonic frequencies of the signals and the difference therebetween. The RIM component may refer to an IM component occurring when a coupling signal caused by a single transmitting-end output is introduced to another adjacent transmitting-end output.

An electronic device and a method for reducing self-interference due to a dual uplink operation according to various embodiments of the disclosure may improve the downlink path transmission environment from self-interference due to a dual uplink operation.

Solution to Problem

An electronic device according to various embodiments of the disclosure may include: a first communication circuit configured to provide first wireless communication; a second communication circuit configured to provide second wireless communication; a processor operatively connected to the first communication circuit and the second communication circuit; and a memory operatively connected to the processor, wherein the memory stores instructions that cause, when executed, the processor to: perform first communication with a first base station using a first frequency band through the first communication circuit; perform second communication with a second base station using a second frequency band through the second communication circuit; determine whether the first communication and the second communication cause interference with each other; and transmit, to the second base station for the second communication, based on a determination result, a request to use a third frequency band different from the second frequency band in at least one of a bandwidth, a center frequency, or a sub-carrier spacing (SCS).

An electronic device according to various embodiments of the disclosure may include: a first communication circuit configured to provide first wireless communication; a second communication circuit configured to provide second wireless communication; a processor operatively connected to the first communication circuit and the second communication circuit; and a memory operatively connected to the processor, wherein the memory stores instructions that cause, when executed, the processor to: perform first communication with a first base station using a first frequency band through the first communication circuit; perform second communication with a second base station using a second frequency band through the second communication circuit; determine whether the first communication and the second communication cause interference with each other; measure the strength of a first signal received from the second base station, based on the determination result; and perform communication with the second base station using a signal of a second strength that is smaller than the first strength when the strength of the first signal is greater than or equal to a first threshold.

A method of reducing self-interference due to a dual uplink operation according to various embodiments of the disclosure may include: performing first communication with a first base station using a first frequency band through a first communication circuit; performing second communication with a second base station using a second frequency band through a second communication circuit; determining whether the first communication and the second communication cause interference with each other; and transmitting a request to use a third frequency band different from the second frequency band in at least one of a bandwidth, a center frequency, or a sub-carrier spacing (SCS), based on the determination result, to the second base station for the second communication.

Advantageous Effects of Invention

An electronic device and a method for reducing self-interference due to a dual uplink operation according to various embodiments of the disclosure may limit the influence of self-influence on the downlink while simultaneously performing two or more uplink operations.

BRIEF DESCRIPTION OF DRAWINGS

FIG. 3A is a flowchart illustrating a method of reducing self-interference due to a dual uplink operation according to various embodiments;

MODE FOR CARRYING OUT THE INVENTION

Figure 1:
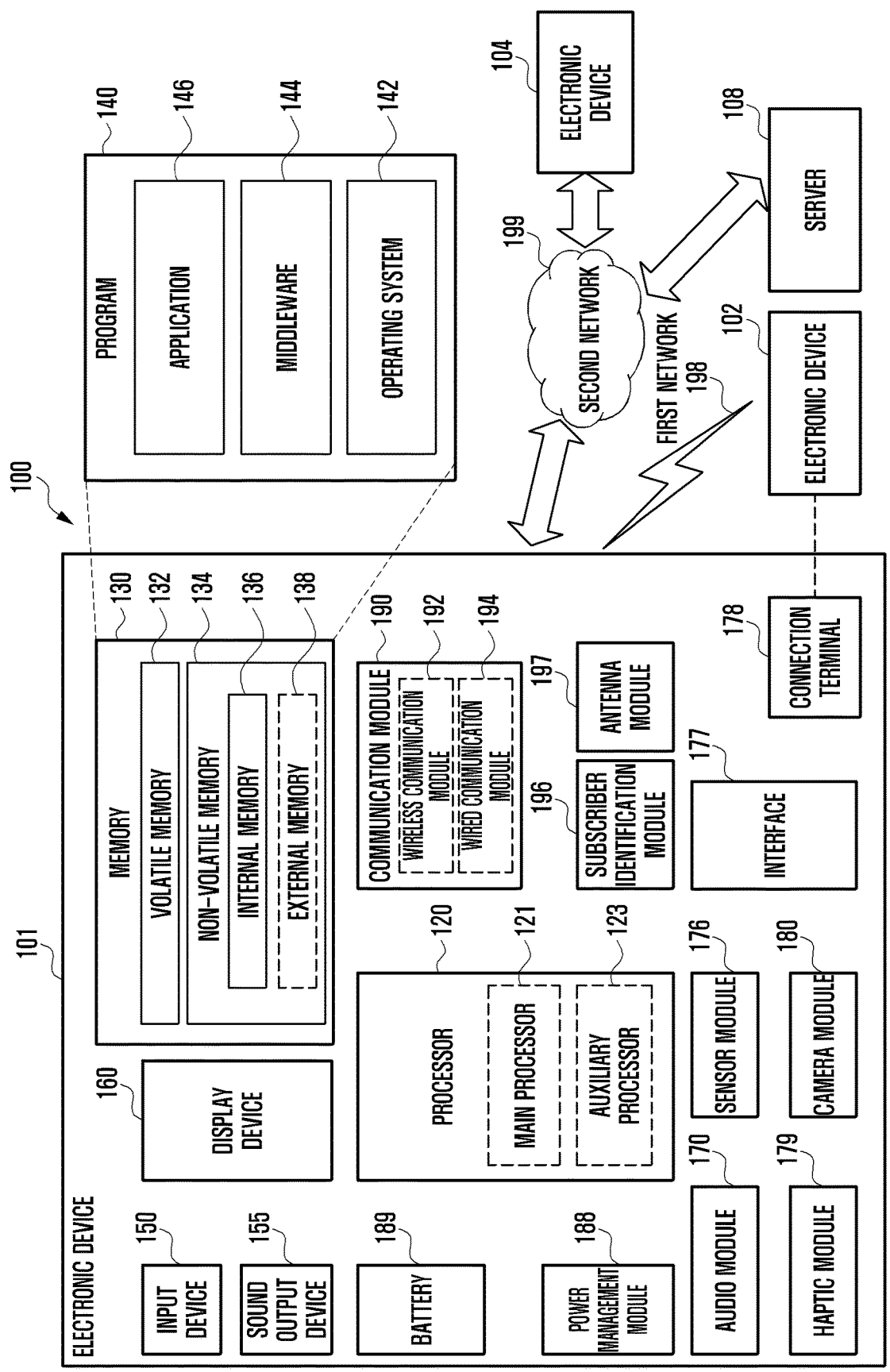
FIG. 1 is a block diagram of an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an example embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector), The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an example embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
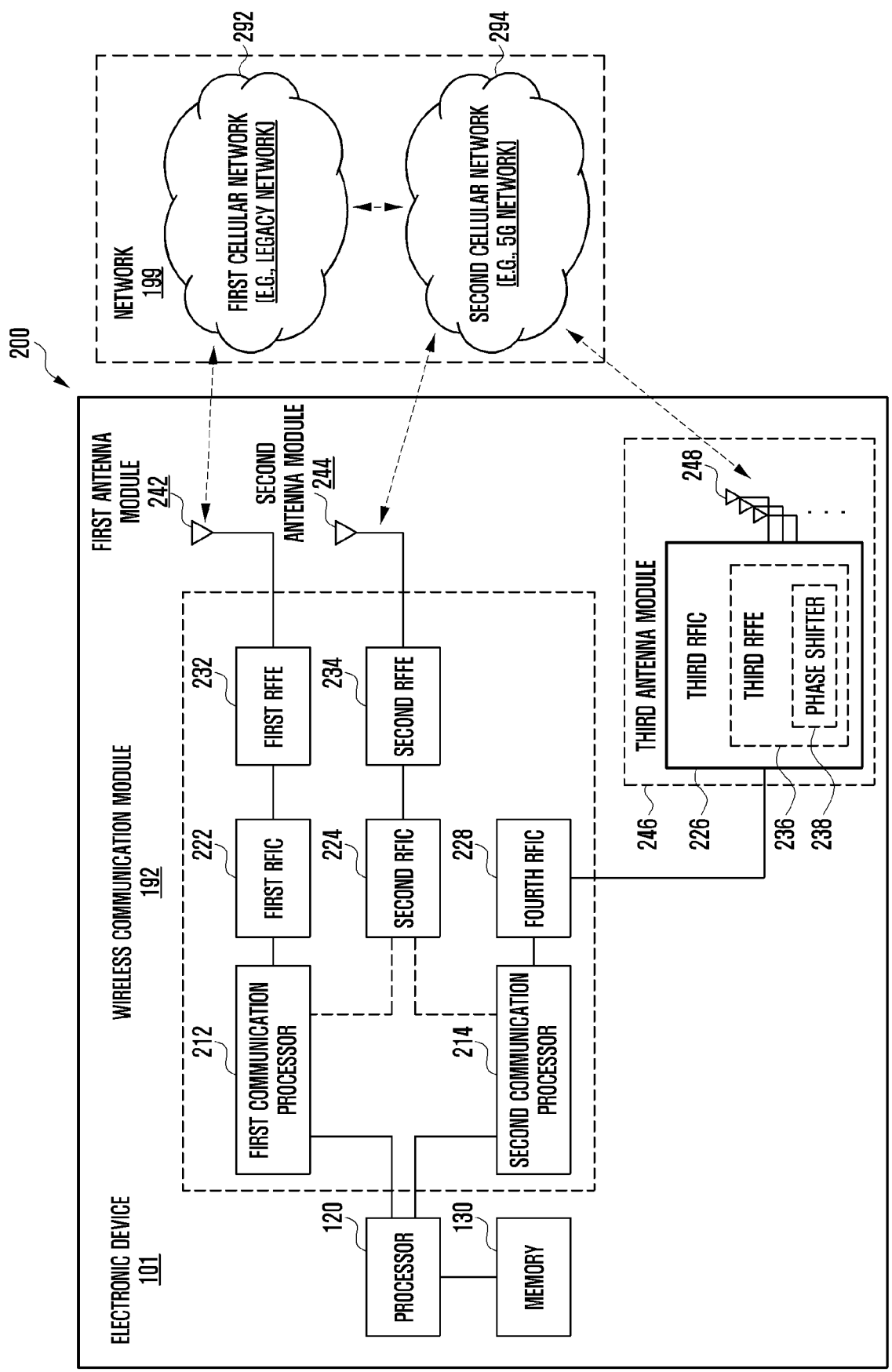
FIG. 2 is a block diagram of an electronic device supporting legacy network communication and 5G network communication according to various embodiments.

FIG. 2 is a block diagram 200 illustrating an example electronic device 101 for supporting legacy network communication and 5G network communication according to various embodiments. Referring to FIG. 2, the electronic device 101 may include a first communication processor (e.g., including processing circuitry) 212, a second communication processor (e.g., including processing circuitry) 214, a first radio frequency integrated circuit (RFIC) 222, a second RFIC 224, a third RFIC 226, a fourth RFIC 228, a first radio frequency front end (RFFE) 232, a second RFFE 234, a first antenna module (e.g., including at least one antenna) 242, a second antenna module (e.g., including at least one antenna) 244, and an antenna 248. The electronic device 101 may further include a processor (e.g., including processing circuitry) 120 and a memory 130. The network 199 may include a first network (e.g., a legacy network) 292 and a second network (e.g., a 5G network) 294. According to another embodiment, the electronic device 101 may further include at least one component among the components illustrated in FIG. 1, and the network 199 may further include at least one different network. According to an embodiment, the first communication processor 212, the second communication processor 214, the first RFIC 222, the second RFIC 224, the fourth RFIC 228, the first RFFE 232, and the second RFFE 234 may form at least a part of the wireless communication module 192. According to another embodiment, the fourth RFIC 228 may be omitted or included as a part of the third RFIC 226.

The first communication processor 212 may include various communication processing circuitry and support establishment of a communication channel in a band to be used for wireless communication with the first network 292, and legacy network communication through the established communication channel. According to various embodiments, the first network may be a legacy network including, for example, and without limitation, a 2G, 3G, 4G, or long term evolution (LTE) network. The second communication processor 214 may support establishment of a communication channel corresponding to a designated band (for example, about 6 GHz to about 60 GHz) among bands to be used for wireless communication with the second network 294, and, for example, and without limitation, 5G network communication through the established communication channel. According to various embodiments, the second network 294 may, for example, be a 5G network as referenced by third generation partnership project (3GPP). Additionally, according to an embodiment, the first communication processor 212 or the second communication processor 214 may support establishment of a communication channel corresponding to another designated band (for example, about 6 GHz or lower) among the bands to be used for wireless communication with the second network 294, and, for example, 5G network communication through the established communication channel. According to an embodiment, the first communication processor 212 and the second communication processor 214 may be implemented inside a single chip or a single package. According to various embodiments, the first communication processor 212 or the second communication processor 214 may, for example, be provided inside a single chip or a single package together with a processor 120, an auxiliary processor 123, or a communication module 190.

The first RFIC 222 may convert a baseband signal generated by the first communication processor 212 into a radio frequency (RF) signal at about 700 MHz to about 3 GHz, which may be used for the first network 292 (for example, legacy network), during transmission. During reception, an RF signal may be acquired from the first network 292 (for example, legacy network) through an antenna (for example, the first antenna module 242), and may be preprocessed through an RFFE (for example, the first RFFE 232). The first RFIC 222 may convert the preprocessed RF signal into a baseband signal such that the same can be processed by the first communication processor 212.

The second RFIC 224 may convert a baseband signal generated by the first communication processor 212 or the second communication processor 214 into an RF signal in a Sub6 band (for example, about 6 GHz or lower) (hereinafter, referred to as a 5G Sub6 RF signal) that may be used for the second network 294 (for example, 5G network). During reception, a 5G Sub6 RF signal may be acquired from the second network 294 (for example, 5G network) through an antenna (for example, the second antenna module 244), and may be preprocessed through an RFFE (for example, the second RFFE 234). The second RFIC 224 may convert the preprocessed 5G Sub6 RF signal into a baseband signal such that the same can be processed by a communication processor corresponding to the first communication processor 212 or the second communication processor 214.

The third RFIC 226 may convert a baseband signal generated by the second communication processor 214 into an RF signal in a 5G Above6 band (for example, about 6 GHz to about 60 GHz) (hereinafter, referred to as a 5G Above6 signal) that is to be used for the second network 294 (for example, 5G network). During reception, a 5G Above6 RF signal may be acquired from the second network 294 (for example, 5G network) through an antenna (for example, the antenna 248), and may be preprocessed through the third RFFE 236. The third RFIC 226 may convert the preprocessed 5G Above6 signal into a baseband signal such that the same can be processed by the second communication processor 214. According to an embodiment, the third RFFE 236 may be formed as a part of the third RFIC 226.

According to an embodiment, the electronic device 101 may include a fourth RFIC 228 separately from the third RFIC 226 or as at least a part thereof. In this example, the fourth RFIC 228 may convert a baseband signal generated by the second communication processor 214 into an RF signal in an intermediate frequency band (for example, about 9 GHz to about 11 GHz) (hereinafter, referred to as an IF signal) and then deliver the IF signal to the third RFIC 226. The third RFIC 226 may convert the IF signal into a 5G Above6 RF signal. During reception, a 5G Above6 RF signal may be received from the second network 294 (for example, 5G network) through an antenna (for example, antenna 248) and converted into an IF signal by the third RFIC 226. The fourth RFIC 228 may convert the IF signal into a baseband signal such that the same can be processed by the second communication processor 214.

According to an embodiment, the first RIFC 222 and the second RFIC 224 may, for example, be implemented as at least a part of a single chip or a single package. According to an embodiment, the first RFFE 232 and the second RFFE 234 may, for example, be implemented as at least a part of a single chip or a single package. According to an embodiment, at least one antenna module of the first antenna module 242 or the second antenna module 244 may be omitted or coupled to another antenna module so as to process RF signal in multiple corresponding bands.

According to an embodiment, the third RFIC 226 and the antenna 248 may be arranged on the same substrate so as to form a third antenna module 246. For example, the wireless communication module 192 or the processor 120 may be arranged on a first substrate (for example, main PCB). In this example, the third RFIC 226 may be formed on a partial area (for example, lower surface) of a second substrate (for example, sub PCB) that is separate from the first substrate, and the antenna 248 may be arranged in another partial area (for example, upper surface), thereby forming a third antenna module 246. The third RFIC 226 and the antenna 248 may be arranged on the same substrate such that the length of the transmission line between the same can be reduced. This may reduce loss (for example, attenuation) of a signal in a high-frequency band (for example, about 6 GHz to about 60 GHz) used for 5G network communication, for example, due to the transmission line. Accordingly, the electronic device 101 may improve the quality or speed of communication with the second network 294 (for example, 5G network).

According to an embodiment, the antenna 248 may, for example, include an antenna array including multiple antenna elements that may be used for beamforming. In this example, the third RFIC 226 may include multiple phase shifters 238 corresponding to the multiple antenna elements, as a part of the third RFFE 236, for example. During transmission, each of the multiple phase shifters 238 may shift the phase of a 5G Above6 RF signal, which is to be transmitted to the outside (for example, base station of 5G network) of the electronic device 101, through a corresponding antenna element. During reception, each of the multiple phase shifters 238 may shift the phase of a 5G Above6 RF signal received from the outside into the same or substantially same phase through a corresponding antenna element. This enables transmission or reception through beamforming between the electronic device 101 and the outside.

The second network 294 (for example, 5G network) may be operated independently of the first network 292 (for example, legacy network) (for example, standalone (SA)), or operated while being connected thereto (for example, non-standalone (NSA)). For example, the 5G network may include an access network (for example, 5G radio access network (RAN) or next-generation network (NG RAN)) and may not include a core network (for example, next-generation core (NGC)). In this example, the electronic device 101 may access the access network of the 5G network and then access an external network (for example, Internet) under the control of the core network (for example, evolved packed core (EPC)) of the legacy network. Protocol information (for example, LTE protocol network) for communication with the legacy network or protocol information (for example, new radio (NR) protocol information) for communication with the 5G network may be stored in the memory 230, and may be accessed by another component (for example, the processor 120, the first communication processor 212, or the second communication processor 214).

According to various embodiments, the electronic device 101 may include a first communication circuit configured to provide a first wireless communication and a second communication circuit configured to provide a second wireless communication. The first communication circuit may, for example, mean a component integrally configured including the first communication processor 212, or a minimum unit or part of a component that is operatively connected to the first communication processor 212 and performs one or more functions. The second communication circuit may, for example, mean a component integrally configured including the second communication processor 214, or a minimum unit or part of a component that is operatively connected to the second communication processor 214 and performs one or more functions.

According to various embodiments, the electronic device 101 may include a first communication circuit (e.g., the first communication processor 212 in FIG. 2) configured to provide a first wireless communication, a second communication circuit (e.g., a second communication processor 214 of FIG. 2) configured to provide a second wireless communication, a processor 120 operatively connected to the first communication circuit and the second communication circuit, and a memory 130 operatively connected to the processor 120. When executed, the memory 130 may store instructions that cause the processor 120 to perform a first communication with a first base station through a first communication circuit using a first frequency band, perform a second communication with a second base station through a second communication circuit using a second frequency band, determine whether the first communication and the second communication interfere with each other, based on the determination result, and transmit a request to use a third frequency band that is different from the second frequency band in at least one of a bandwidth, a center frequency, or a sub-carrier spacing (SCS) to the second base station for the second communication.

According to various embodiments, the instructions may cause the processor 120 to receive at least one piece of frequency band information from the first base station or the second base station, and select the third frequency band based on the at least one frequency band information while performing second communication with the second base station through the second communication circuit using the second frequency band.

According to various embodiments, the frequency band information may include at least one of a bandwidth of a third frequency band, a center frequency, or subcarrier spacing information.

According to various embodiments, the instructions may cause the processor 120 to generate a random access channel (RACH) preamble, based on a random access channel (RACH) setting associated with a third frequency band, based on the selected third frequency band, and transmit the request by transmitting the RACH preamble to the second base station.

According to various embodiments, the RACH preamble may follow the 3rd generation partnership project (3GPP) standard.

According to various embodiments, the instructions may cause the processor 120 to, in order to determine whether the first communication and the second communication interfere with each other, estimate a self-interference region, based on the first frequency band and the second frequency band.

According to various embodiments, the instructions may cause the processor 120 to determine whether the difference between the center frequency domain of the first frequency band or the center frequency domain of the second frequency band and the self-interference region is within a first threshold value, and determine whether the first communication and the second communication interfere with each other, based on the determination.

According to various embodiments, the instructions may cause the processor 120 to select a third frequency band having the same bandwidth as the second frequency band and different center frequency, based on the at least one frequency band information.

According to various embodiments, the instructions may cause the processor 120 to select a third frequency band having the same center frequency as and a different bandwidth from the second frequency band, based on the at least one frequency band information.

According to various embodiments, the instructions may cause the processor 120 to select the third frequency band having a different center frequency and bandwidth from the second frequency band, based on at least one frequency band information.

According to various embodiments, the instructions may cause the processor 120 to select the third frequency band, which has the same center frequency and bandwidth as the second frequency band, but different values of subcarrier spacing, based on the at least one frequency band information.

According to various embodiments, the electronic device 101 may include a first communication circuit (e.g., the first communication processor 212 of FIG. 2) configured to provide a first wireless communication, a second communication circuit (e.g., a second communication processor 214 of FIG. 2) configured to provide a second wireless communication, a processor 120 operatively connected to the first communication circuit and the second communication circuit, and a memory 130 operatively connected to the processor 120. When executed, the memory 130 may store instructions that cause the processor 120 to perform a first communication with a first base station using a first frequency band through a first communication circuit, perform a second communication with a second base station using a second frequency band and using a signal of a first strength through a second communication circuit, determine whether the first communication and the second communication interfere with each other, based on the determination result, measure the strength of the first signal received from the second base station, and perform communication with the second base station by using a signal of a second strength less than the first strength when the strength of the first signal is greater than or equal to the first threshold value.

According to various embodiments, the instructions may cause the processor 120 to adjust the level of a bias signal to be input to the AMP at the transmitting end of the second communication circuit in order to use the signal of the second strength.

According to various embodiments, the instructions may cause the processor 120 to modify at least one parameter that determines the transmission power in order to use the signal of the second strength.

According to various embodiments, the instructions may cause the processor 120 to adjust the modulation and coding schemes (MCS) of the signal of the second strength when the second strength is lower than a second threshold value lower than the first threshold value.

According to various embodiments, the instructions may cause the processor 120 to repeatedly transmit the signal of the second strength when the second strength is lower than a second threshold value lower than the first threshold value.

FIG. 3A is a flowchart illustrating a method of reducing self-interference due to a dual uplink operation according to various embodiments.

Referring to FIG. 3A, in operation 310, the electronic device 101 (or the processor 120) according to various embodiments may perform first communication with the first base station using a first frequency band through a first communication circuit (e.g., the first communication processor 212 in FIG. 2). The first communication may include legacy communication, for example, second generation (2G) communication, 3G communication, 4G communication, or long term evolution (LTE) communication. The first frequency band may mean, for example, a designated band of about 6 GHz or less. According to an embodiment, the first frequency band may include a downlink band and an uplink band that are distinguished from each other. The first base station may include, for example, a legacy base station (e.g., eNB) having a large cell radius. According to an embodiment, the electronic device 101 may perform a first uplink operation of transmitting data from the electronic device 101 to the first base station using at least a portion of the first frequency band (e.g., an uplink band).

In operation 320, the electronic device 101 (or the processor 120) according to various embodiments may perform second communication with the second base station using a second frequency band through a second communication circuit (e.g., the second communication processor 214 in FIG. 2). The second communication may include, for example, 5G communication or pre-5G communication. According to an embodiment, the second frequency band may mean a frequency band that is at least higher than the first frequency band, for example, a designated band of about 300 MHz to about 100 GHz. According to an embodiment, the second frequency band may mean the same frequency band as the first frequency band, for example, a designated band of about 300 MHz to about 6 GHz. According to an embodiment, the second frequency band may mean a frequency band that is at least lower than the first frequency band, for example, a designated band of about 300 MHz to about 6 GHz.

According to an embodiment, the second frequency band may be used as an area for uplink and/or downlink. For example, the second frequency band may include an uplink/downlink (UL/DL) band. The second base station may include, for example, an NR base station (e.g., gNB) forming a small cell radius within a cell formed by the first base station. According to an embodiment, the electronic device 101 may perform a second uplink operation of transmitting data from the electronic device 101 to the second base station using at least a portion of the second frequency band. Hereinafter, the dual uplink operation defined in the disclosure may be understood as a case in which a first uplink operation and a second uplink operation are simultaneously performed. Alternatively, the dual uplink operation defined in the disclosure may be understood as a case in which the first communication circuit and the second communication circuit independently perform the first uplink operation and the second uplink operation, respectively.

In operation 330, the electronic device 101 (or the processor 120) according to various embodiments may determine whether the first communication and the second communication interfere with each other.

According to various embodiments, the processor 120 may determine the possibility of occurrence of self-interference using the first frequency band and/or the second frequency band. For example, the processor 120 may estimate a self-interference zone in which harmonics and/or inter-modulation distortion (IMD) may occur using the uplink band boundary value of the first frequency band (e.g., the upper and/or lower limit value of the uplink band) and/or the boundary value of the second frequency band (e.g., the upper limit value and/or the lower limit value of the uplink/downlink (UL/DL) band), and may determine the possibility of self-interference through the estimated self-interference region. For example, the electronic device 101 (or the processor 120) may check whether the self-interference region in the designated downlink is included and determine the possibility of self-interference.

According to an embodiment, the processor 120 may estimate a self-interference region, based on a first frequency band and a second frequency band, check whether the difference between the center frequency domain of the first frequency band or the center frequency domain of the second frequency band and the self-interference region is within a first threshold value, and determine whether the first communication and the second communication interfere with each other, based on the check result. The self-interference might not occur only when the self-interference region in the downlink band is included, but may also occur when the downlink region and the interference region are adjacent to each other. Accordingly, if the self-interference region and the downlink band exist adjacent to each other within a predetermined distance, it may be determined that there is a possibility of self-interference.

According to an embodiment, the electronic device 101 may determine the possibility of occurrence of self-interference, based on whether a difference between the center frequency domain of the downlink band and the self-interference region is within a first threshold value. The center frequency domain of the first frequency band or the center frequency domain of the second frequency band may be checked by using at least some of the information included in the radio resource control (RRC) signal received from the first base station or the second base station by the electronic device 101 (or processor 120). In an embodiment, the RRC signal may be a signal broadcast by a first base station or a second base station. In an embodiment, the RRC signal may be a signal (dedicate RRC signaling) transmitted by the first base station or the second base station to the electronic device 101 (or the processor 120).

According to an embodiment, the processor 120 may check information on a frequency domain in which self-interference may occur, based on a hardware filter characteristic or the like. For example, the electronic device 101 may store information on a frequency domain in which self-interference may occur in the memory 130, and the processor 120 may check the possibility of occurrence of self-interference in advance when selecting a frequency band.

According to various embodiments, the electronic device 101 may pre-store information about various frequency bands available for second communication. The frequency band information (e.g., BWP configuration information) may include, for example, bandwidth part (BWP) information for bandwidth adaptation for the second communication. For example, the frequency band information may include at least one of a location, a bandwidth, a center frequency, a subcarrier spacing, or operation numerology information of a BWP in a system band.

According to various embodiments, the electronic device 101 may receive frequency band information from a base station. According to one embodiment, the electronic device 101 may receive frequency band information using a dedicated RRC signal specific to the electronic device 101 or an RRC signal (e.g., system information) specific to a base station (or cell). According to an embodiment, the frequency band information may include one or more pieces of bandwidth part (BWP) information. Each piece of the BWP information may differ in at least one of the location, bandwidth, center frequency, subcarrier spacing, or operation numerology information of the BWP in the system band.

According to various embodiments, the BWP information may be associated with one or more scheduling requests (SR) settings. For example, when BWP 1, BWP 2, and BWP 3 are set through RRC, the BWP 1 information may include at least one of SR setting for BWP 1, SR configuration for BWP 2, and SR configuration for BWP 3. As another example, the BWP 2 information and/or the BWP 3 information may include SR configuration for another BWP. In some embodiments, specific BWP information may include only SR configuration for the specific BWP or may include configuration for some BWP. The SR setting may include, for example, at least one of SR transmission frequency resource, SR transmission time resource, SR transmission power, SR transmission MCS, or SR transmission.

According to various embodiments, a random access channel (RACH) may be transmitted in at least one uplink BWP among uplink BWPs configured in a terminal. In an embodiment, the BWP through which the RACH may be transmitted may include an initial UL BWP. In an embodiment, the BWP through which the RACH may be transmitted may include a default UL BWP. For example, when BWP 1, BWP 2, and BWP 3 are set through RRC, RACH transmission may be possible in BWP 1 and BWP 2, and RACH transmission may not be possible in BWP 3. In an embodiment, that RACH transmission is possible in the BWP may mean that information for RACH transmission is included in the BWP configuration information. In another embodiment, that RACH transmission is possible in the BWP may mean that a case in which a band for RACH transmission is set within an operating band of the BWP may be included. The RACH setting may include, for example, at least one of RACH transmission frequency resource, RACH transmission time resource, RACH preamble ID, RACH transmission power, RACH transmission timer related information, and RACH cyclic shift information.

In operation 340, according to various embodiments, the electronic device 101 (or the processor 120) may transmit a request to use a third frequency band different from the second frequency band in at least one of a bandwidth, a center frequency, or a sub-carrier spacing (SCS) to the second base station, based on the determination result, for the second communication. According to an embodiment, the processor 120 may request the second base station to use the third frequency band through the second communication circuit. For example, the processor 120 may select a third frequency band with a low possibility of self-interference based on the stored information of a plurality of frequency bands, and may propose to the second base station to perform the second communication through the third frequency band.

According to various embodiments, the processor 120 may receive at least one frequency band information from a first base station or a second base station using the second frequency band through the second communication circuit while performing the second communication with the second base station, and may select the third frequency band, based on the at least one frequency band information. For example, the processor may transmit a scheduling request (SR) associated with at least one frequency band to a first base station or a second base station in order to receive at least one frequency band information, and may receive at least one frequency band information from the first base station or the second base station in response to the SR. According to an embodiment, SR transmission may comply with a 3rd generation partnership project (3GPP) standard. According to an embodiment, the frequency band information may include at least one of a location, a bandwidth, a center frequency, a subcarrier spacing, or operation neurology information of a BWP in a system band.

According to various embodiments, the processor 120 may receive at least one frequency band information from a first base station or a second base station using the second frequency band through the second communication circuit while performing the second communication with the second base station, and may select the third frequency band, based on the at least one frequency band information. For example, the electronic device 101 or the processor 120 may check the RACH setting associated with the selected third frequency band, generate a RACH preamble, and transmit the RACH preamble to the first base station or the second base station. Thereafter, response information for the RACH may be received from the first base station or the second base station in a downlink BWP band associated with the third frequency band. According to an embodiment, the downlink BWP band associated with the third frequency band may be the same as the third frequency band. According to an embodiment, RACH transmission may comply with a 3rd generation partnership project (3GPP) standard. According to an embodiment, the frequency band information may include at least one of a location, a bandwidth, a center frequency, a subcarrier spacing, or operation neurology information of a BWP in a system band.

According to various embodiments, in order to select a third frequency band (e.g., a BWP to be activated), the processor 120 may select a BWP whose frequency band position is farthest from the second frequency band (e.g., currently activated BWP), or select the BWP with the smallest bandwidth as the third frequency band. According to an embodiment, the processor 120 may measure radio signal quality for at least one BWP that is not activated, and select a BWP having the best radio signal quality as the third frequency band.

According to various embodiments, the processor 120 may perform at least one of an operation of selecting a BWP that is the farthest apart from a currently activated BWP and a frequency band position, selecting a BWP having the smallest bandwidth, measuring the quality of a radio signal for a BWP that is not activated, selecting a BWP having the best measured radio signal quality, or a combination thereof. According to various embodiments, the operation by the combination may include at least two of the operations of selecting a BWP with the best radio signal quality measured from among BWPs with a bandwidth smaller than a specific value, selecting a BWP with a frequency band farthest apart from the currently activated BWP from among BWPs having a bandwidth smaller than a specific value, and the BWP with the best measured radio signal quality from among the BWPs whose frequency band location is separated by a specific value or more from the currently active BWP.

The processor 120 may measure wireless signal quality using a synchronization signal or a reference signal included in the BWP. According to an embodiment, the processor 120 may measure radio signal quality using a synchronization signal block (SSB) included in the BWP. According to another embodiment, when a channel state information reference signal (CSI-RS) that has already been allocated or is allocated by request can be used, the processor 120 may measure radio signal quality of non-activated BWPs using the allocated CSI-RS. The quality measurement of the radio signal may be performed within a possible interference period, or may be performed regardless of a possible interference period.

According to various embodiments, the processor 120 may perform second communication using a third frequency band having a different center frequency from the second frequency band. For example, the processor 120 may check the possibility of occurrence of self-interference due to BWP 1 and the possibility of occurrence of self-interference by BWP 2 using frequency band information for BWP 1 and/or frequency band information for BWP 2 having a different center frequency from BWP 1. According to various embodiments, the processor 120 may select a third frequency band having the same bandwidth as the second frequency band and having a different center frequency based on at least one frequency band information. For example, the processor 120 may perform the second communication by selecting a BWP 2 having the same bandwidth as and different center frequency from BWP 1.

In some embodiments, even if there are a plurality of available frequency bands, it may not be possible to select a frequency band with a low possibility of occurrence of self-interference. For example, it may be difficult to select a specific frequency band if there is a possibility of self-interference in all of the available frequency bands. According to various embodiments, the processor 120 may reduce the bandwidth of the second frequency band by using the frequency band information. For example, when the bandwidth of the frequency band is reduced, since the self-interference region is also reduced, the influence of the self-interference can be eliminated or reduced. According to various embodiments, the processor 120 may select a third frequency band having the same center frequency as the second frequency band and a different bandwidth, based on at least one frequency band information. For example, the processor 120 may perform the second communication by selecting BWP 2 having the same bandwidth as and different center frequency from BWP 1.

According to various embodiments, the processor 120 may select a frequency band having a different center frequency from the second frequency band, and reduce the bandwidth of the selected frequency band by using the frequency band information of the selected frequency band. For example, the processor 120 may reduce the self-interference region by selecting a frequency band having the lowest possibility of self-interference among a plurality of available frequency bands and then reducing the bandwidth of the frequency band. According to various embodiments, the processor 120 may select a third frequency band, which has the same center frequency as and different bandwidth from BWP 2, based on at least one frequency band information. For example, the processor 120 may perform the second communication by selecting BWP 2 having the same center frequency as and different bandwidth from BWP 1.

According to various embodiments, the processor 120 may use a third frequency band in which a value of subcarrier spacing of the second frequency band is changed. When the value of subcarrier spacing changes, a reference sensitivity power level (REFSENS) value that affects self-interference may also change. The REFSENS value may be calculated based on the resource block of the electronic device 101. According to various embodiments, the processor 120 may select a third frequency band having the same center frequency and bandwidth as the second frequency band but different values of subcarrier spacing, based on at least one frequency band information. For example, the processor 120 may perform the second communication by selecting BWP 2 having different center frequency and sub-carrier spacing from BWP 1.

According to various embodiments, the processor 120 may select the third frequency band in which at least two or more of the values of center frequency, the bandwidth, or the subcarrier spacing are different from the second frequency band, based on the at least one frequency band information. For example, the processor 120 may perform the second communication by selecting BWP 2 having different values of center frequency and sub-carrier spacing from BWP 2.

Figure 3B:
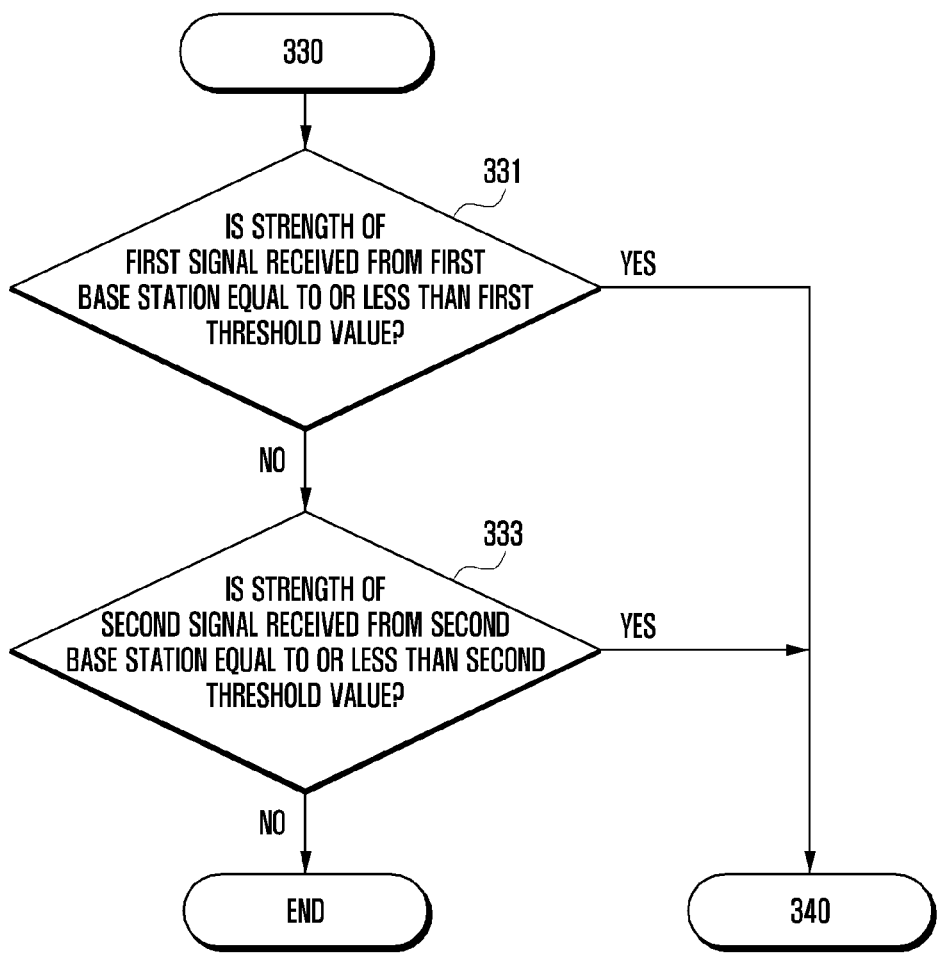
FIG. 3B is a diagram illustrating a method of estimating an influence degree of self-interference according to various embodiments.

FIG. 3B is a diagram illustrating a method of estimating an influence degree of self-interference according to various embodiments. According to an embodiment, the operations of FIG. 3B may be included as part of or additionally to operation 330 of FIG. 3A. According to some embodiments, the processor 120 may be configured to selectively perform the operations of FIG. 3B when determining that the first communication and the second communication do not interfere with each other.

Referring to FIG. 3B, in operation 331, the electronic device 101 (or the processor 120) according to various embodiments may check whether the strength of the first signal received from the first base station is less than a first threshold value. When the strength of the first signal is weak, even if the self-interference region is small or the self-interference region is separated from the first or second frequency band, the influence of the self-interference may be relatively large. For example, the strength of the first signal and the degree of influence of self-interference may be in inverse proportion.

According to an embodiment, after checking the REFSENS value of the first signal, the processor 120 may check whether the REFSENS value is less than a specified first threshold value to estimate the degree of influence of the self-interference in advance.

If the strength of the first signal received from the first base station is less than the first threshold value, the electronic device 101 (or the processor 120) according to various embodiments may perform operation 340. For example, even if it is determined that the first communication and the second communication do not interfere with each other, the processor 120 may perform operations to reduce self-interference. According to an embodiment, the processor 120 may change some of the parameters related to the second frequency band for the second communication.

In operation 331 again, if the strength of the first signal received from the first base station is greater than or equal to the first threshold value, the electronic device 101 (or the processor 120) according to various embodiments may check whether the strength of the second signal received from the second base station is less than the second threshold value. When the strength of the second signal is weak, the strength of the uplink signal (e.g., a signal transmitted to the second base station) in the second frequency band may increase. For example, the degree of influence of self-interference may be relatively large compared to the first signal strength.

According to an embodiment, after checking the REFSENS value of the second signal, the processor 120 may check in advance whether the REF SENS value is less than a designated second threshold value to estimate the degree of influence of the self-interference in advance.

If the strength of the second signal received from the second base station is less than the second threshold value, the electronic device 101 (or the processor 120) according to various embodiments may perform operation 340. For example, even if it is determined that the first communication and the second communication do not interfere with each other, the processor 120 may perform operations to reduce self-interference. According to an embodiment, the processor 120 may change some of the parameters related to the second frequency band for the second communication.

In operation 333 again, if the strength of the second signal received from the second base station is greater than or equal to the second threshold, the electronic device 101 (or the processor 120) according to various embodiments may perform first communication and second communication using a previously activated communication band frequency without performing operation 340. According to an embodiment, the processor 120 may check whether the self-interference region is small, or the first or second frequency band and the self-interference region are spaced apart from each other, and may not perform operation 340, based on the check result.

According to various embodiments, a method of reducing self-interference due to dual uplink operation may include performing first communication with a first base station using a first frequency band through a first communication circuit (310), performing second communication with a second base station using a second frequency band through a second communication circuit (320), determining whether the first communication and the second communication interfere with each other (330), and transmitting a request to use a third frequency band different from the second frequency band in at least one of a bandwidth, a center frequency, or a sub-carrier spacing (SCS) to the second base station, for the second communication, based on the determination result (340).

According to various embodiments, the method may include receiving at least one frequency band information from a first base station or a second base station using the second frequency band through the second communication circuit while performing the second communication with the second base station and selecting a third frequency band, based on the at least one frequency band information.

According to various embodiments, the frequency band information may include at least one of a bandwidth, a center frequency, or subcarrier spacing information of the third frequency band.

According to various embodiments, the method may include generating a RACH preamble based on a random access channel (RACH) setting associated with a third frequency band based on the selected third frequency band, and transmitting a request by transmitting a RACH preamble to the second base station.

Figure 4:
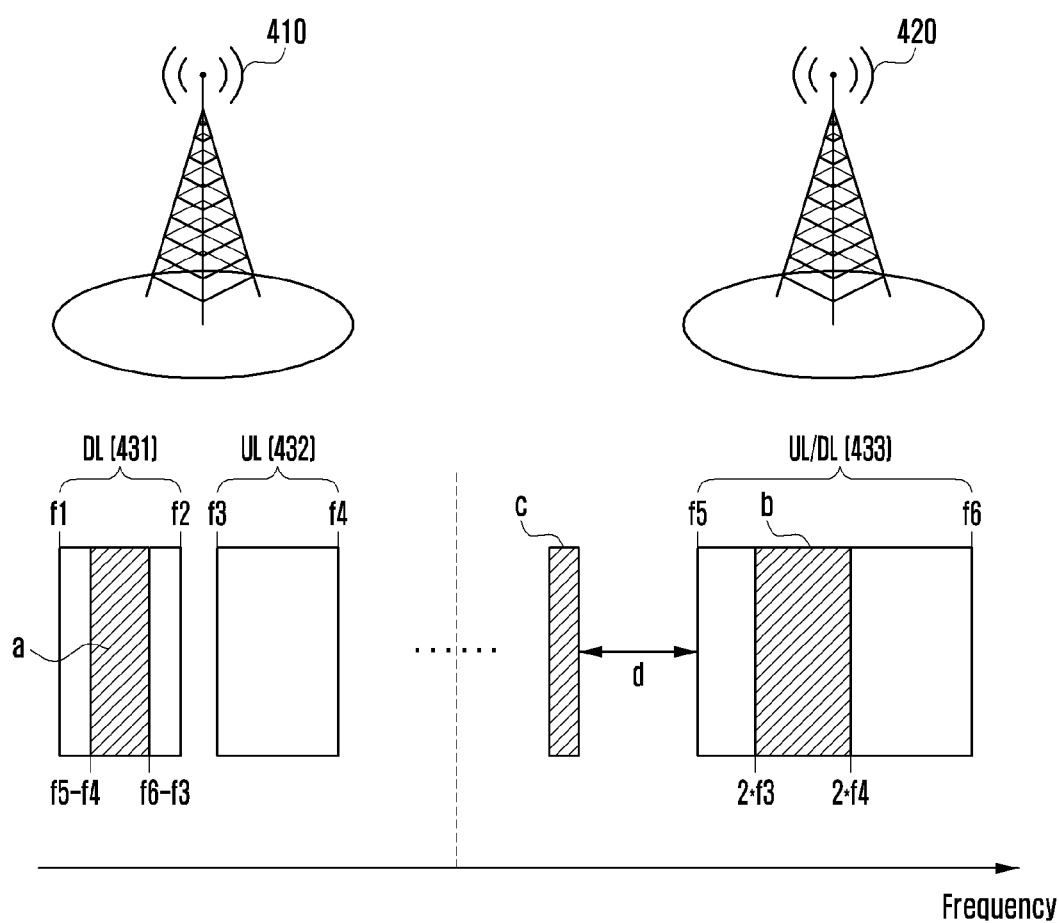
FIG. 4 is a diagram illustrating a method of estimating a self-interference region according to various embodiments.

FIG. 4 is a diagram illustrating a method of estimating a self-interference region according to various embodiments.

Referring to FIG. 4, an electronic device 101 may communicate with a first base station 410 using a first frequency band. For example, the first frequency band may include a downlink band 431 of bands f1 to f2 and an uplink band 432 of bands f3 to f4. The first base station 410 may include, for example, a legacy base station (e.g., an eNB) having a large cell radius. The first base station 410 may support second generation (2G) communication, 3G communication, 4G communication, or long term evolution (LTE) communication, for example.

The electronic device 101 may communicate with a second base station 420 using a second frequency band. The second frequency band may include an uplink/downlink (UL/DL) band 433 of bands f5 to f6. The second base station 420 may include, for example, an NR base station (e.g., gNB) forming a small cell radius within a cell formed by the first base station 410. The second base station 420 may include, for example, 5G communication or pre-5G communication. According to various embodiments, the second base station 420 may use a time division duplex (TDD) scheme in which data is transmitted using different times. According to the TDD scheme, the electronic device 101 may perform uplink transmission and downlink transmission using one uplink/downlink (UL/DL) band 433.

According to various embodiments, the electronic device 101 may check whether the uplink/downlink (UL/DL) band 433 is included in a multiple frequency band of the uplink band 432 to estimate a self-interference region. For example, if the uplink/downlink (UL/DL) band 433 (e.g., f5 to f6 band) includes a second self-interference region (b) (e.g., 2*f3 to 2*f4 band), the electronic device 101 may determine that there is a possibility of self-interference.

According to various embodiments, the electronic device 101 may estimate a self-interference region due to a combination of a sum and difference of the boundary values of the uplink/downlink (UL/DL) band 433 and the boundary values of the uplink band 432. For example, if the first self-interference region (a) (e.g., f5-f4 to f6-f3 band) is included in the downlink band 431 (e.g., band f1 to f2), the electronic device 101 may determine that there is a possibility of self-interference.

Although not shown, if the difference between the center frequency domain of the downlink band 431 or the center frequency domain of the uplink/downlink (UL/DL) band 433 and the self-interference region is within a first threshold, the electronic device 101 may determine that there is a possibility of self-interference. For example, if the third self-interference region c and the uplink/downlink (UL/DL) band 433 are located within the first threshold value d, the electronic device 101 may determine that there is a possibility of self-interference.

Figure 5:
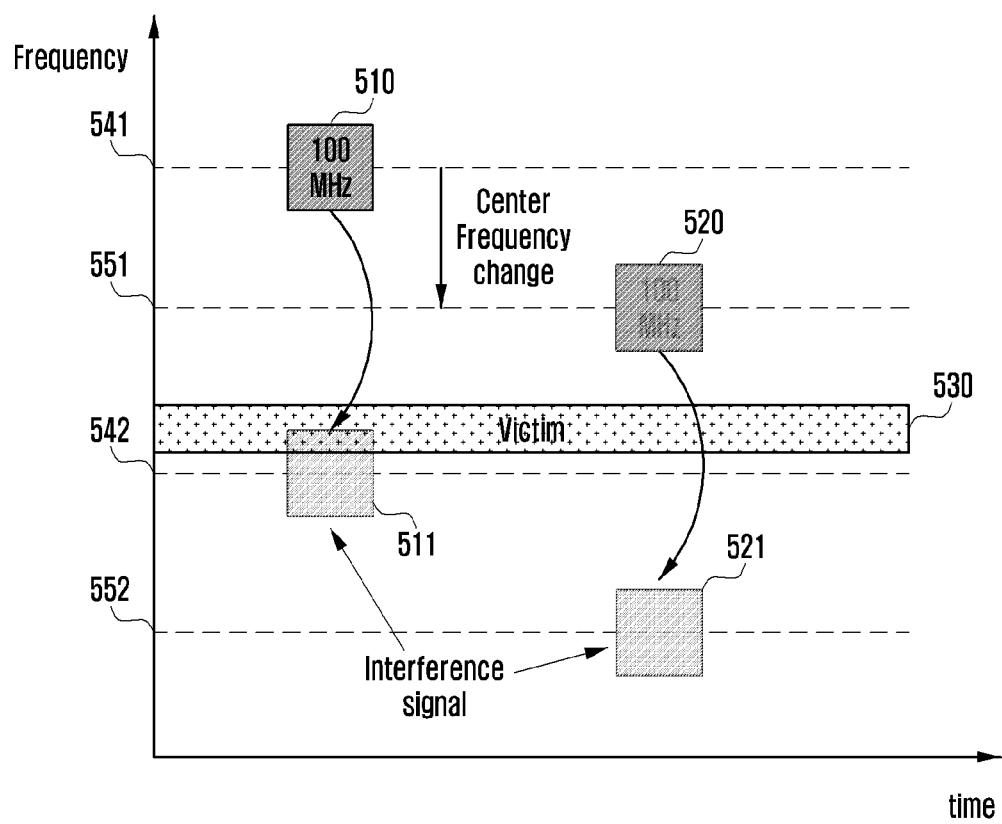
FIG. 5 is a diagram illustrating a method of selecting another frequency band having a different center frequency according to various embodiments.

FIG. 5 is a diagram illustrating a method of selecting another frequency band having a different center frequency according to various embodiments.

Referring to FIG. 5, BWP 1 510 having a first center frequency 541 and BWP 2 520 having a second center frequency 551 are shown. A processor 120 may check the possibility of self-interference caused by the BWP 1 510 and the possibility of self-interference caused by the BWP 2 520 by using the frequency band information for the BWP 1 510 (e.g., location, bandwidth, center frequency, subcarrier spacing or operation numerology of BWP) and the frequency band information for the BWP 2 520 (e.g., location, bandwidth, center frequency, subcarrier spacing or motion numerology of BWP) having at least a different center frequency from the BWP 1 510.

For example, when using the BWP 1 510, the first self-interference region 511 may occur at the third center frequency 542, and when using the BWP 2 520, the second self-interference region 521 may occur at the fourth center frequency 552.

According to an embodiment, at least a part of the first self-interference region 511 generated when the BWP 1 510 is used may be included in the downlink band 530 with the first base station (e.g., the first base station 410 in FIG. 4). That is, when the BWP 1 510 is used, there may be a possibility of self-interference. On the other hand, the second self-interference region 521 generated when the BWP 2 520 is used can avoid the downlink band 530 with the first base station (e.g., the first base station 410 of FIG. 4). According to various embodiments, the electronic device 101 may select a BWP (e.g., BWP 2 520) to be activated instead of a currently activated BWP (e.g., BWP 1 510) to avoid self-interference through a second communication circuit (e.g., the second communication processor 214 in FIG. 2) to perform the second communication (e.g., 5G communication or pre-5G communication) with the second base station (e.g., the second base station 420 of FIG. 4).

Figure 6:
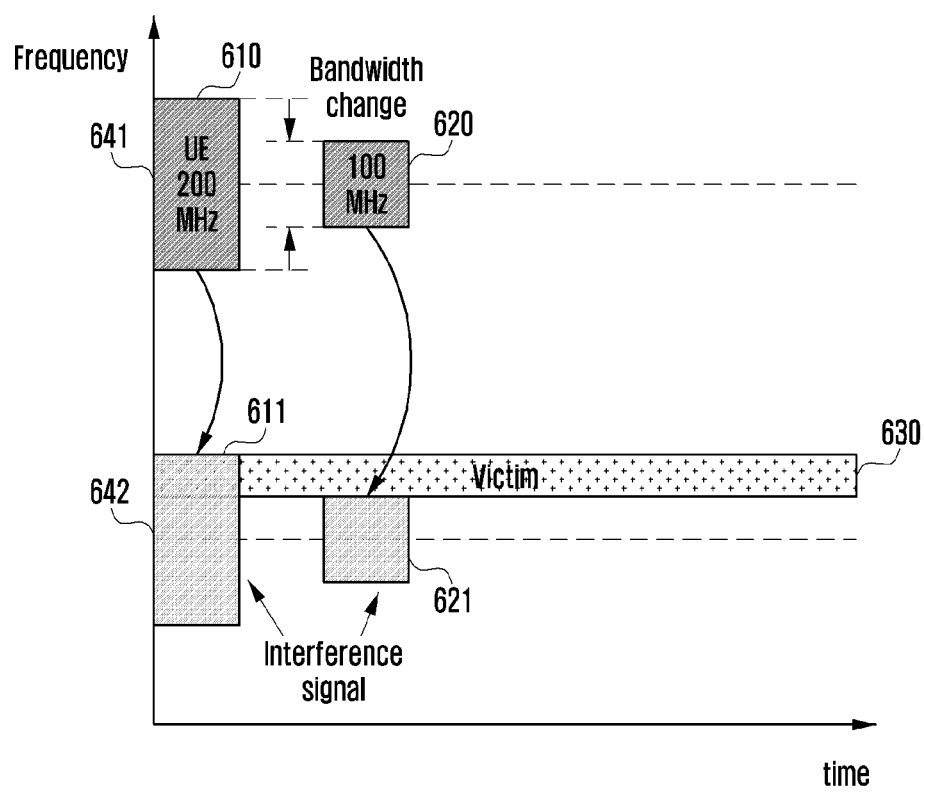
FIG. 6 is a diagram illustrating a method of selecting another frequency band having the same center frequency according to various embodiments.

FIG. 6 is a diagram illustrating a method of selecting another frequency band having the same center frequency according to various embodiments.

Referring to FIG. 6, a BWP 1 610 having a first center frequency 641 is shown. A processor 120 may check the possibility of self-interference caused by the BWP 1 610 by using the frequency band information for the BWP 1 610 (e.g., location, bandwidth, center frequency, subcarrier spacing or operation numerology of BWP). For example, when the BWP 1 610 is used, a first self-interference region 611 may occur at a second center frequency 642. For example, at least a part of the first self-interference region 611 generated when the BWP 1 610 is used may be included in a downlink band 630 with the first base station (e.g., the first base station 410 in FIG. 4).

According to various embodiments, the processor 120 may reduce self-interference by reducing a bandwidth of a frequency in use or to be used (e.g., BWP 1 610). For example, when the processor 120 uses the BWP 1 610, it is determined that there is a possibility of self-interference, and if it is impossible to select another frequency band capable of avoiding self-interference among other available frequency bands, self-interference can be reduced by reducing the bandwidth of the BWP 1 610.

For example, it is possible to use the BWP 2 620 having the first center frequency 641 and reducing the bandwidth of the BWP 1 610. Since the bandwidth of the BWP 2 620 (e.g., 100 MHz) has a smaller bandwidth than that of the BWP 1 610 (e.g., 200 MHz), the second self-interference region 621 generated in the second center frequency 642 may also be smaller than the first self-interference region 611. For example, the second self-interference region 621 generated when using the BWP 2 620 can avoid the downlink band 630 with the first base station.

Figure 7:
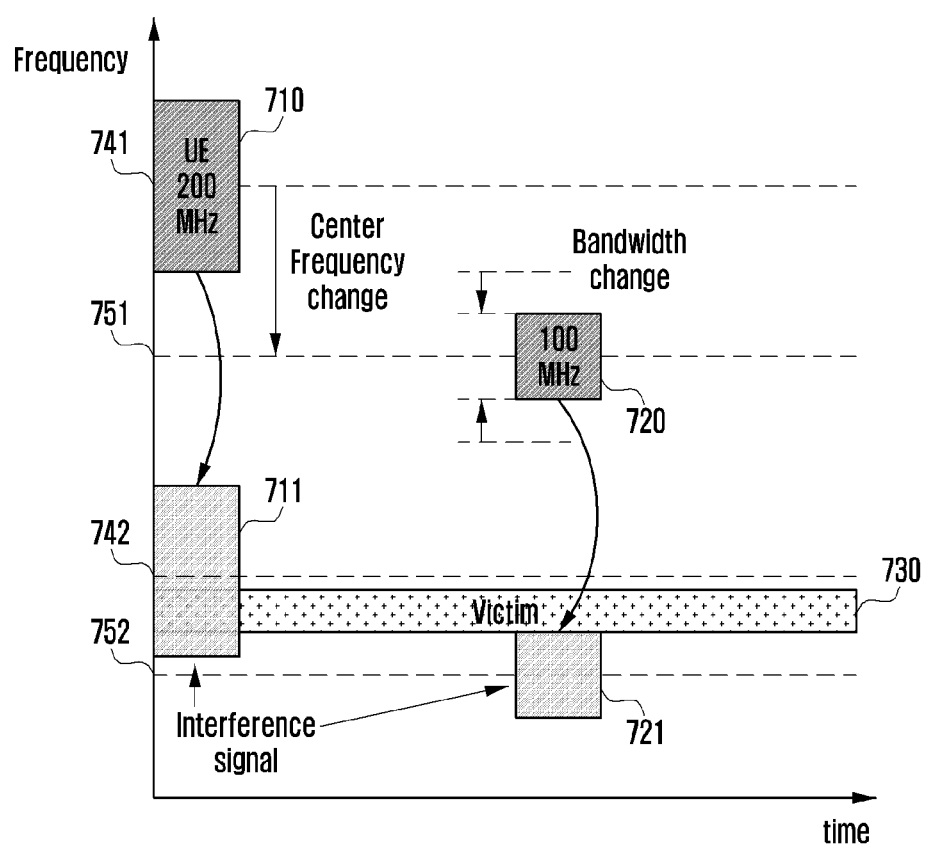
FIG. 7 is a diagram illustrating a method of selecting another frequency band having a different center frequency and a reduced bandwidth according to various embodiments.

FIG. 7 is a diagram illustrating a method of selecting another frequency band having a different center frequency and a reduced bandwidth according to various embodiments.

Referring to FIG. 7, BWP 1 710 having a first center frequency 741 is shown. A processor 120 may check the possibility of self-interference caused by the BWP 1 710 by using the frequency band information on the BWP 1 710 (e.g., the location, the bandwidth, the center frequency, the subcarrier spacing or the operation numerology) of the BWP. For example, when the BWP 1 710 is used, the first self-interference region 711 may occur at the second center frequency 742. For example, at least a part of the first self-interference region 711 generated when the BWP 1 710 is used may be included in the downlink band 730 with a first base station (e.g., the first base station 410 in FIG. 4).

According to various embodiments, the processor 120 may select a frequency band in which less self-interference or no self-interference occurs, and reduce the selected bandwidth. For example, in the case of using the BWP 1 710, when it is determined that there is a possibility of self-interference, and it is impossible to select another frequency band that can avoid self-interference among the available frequency bands, the processor 120 may reduce self-interference by selecting a frequency band having the least self-interference and reducing the selected bandwidth.

For example, after selecting the BWP having the second center frequency 751, the bandwidth of the selected BWP is reduced (e.g., reduced from 200 MHz to 100 MHz) to obtain the BWP 2 720. For example, in the case of the BWP 2 720, the second center frequency 751 may have a smaller bandwidth (e.g., 100 MHz) than the bandwidth of the BWP 1 710 (e.g., 200 MHz). The second self-interference region 721 generated by the BWP 2 720 may have a different center frequency from the first self-interference region 711 and may be formed with a smaller bandwidth than the first self-interference region 711. For example, the second self-interference region 721 can avoid overlapping with the downlink band 730 with the first base station.

Figure 8:
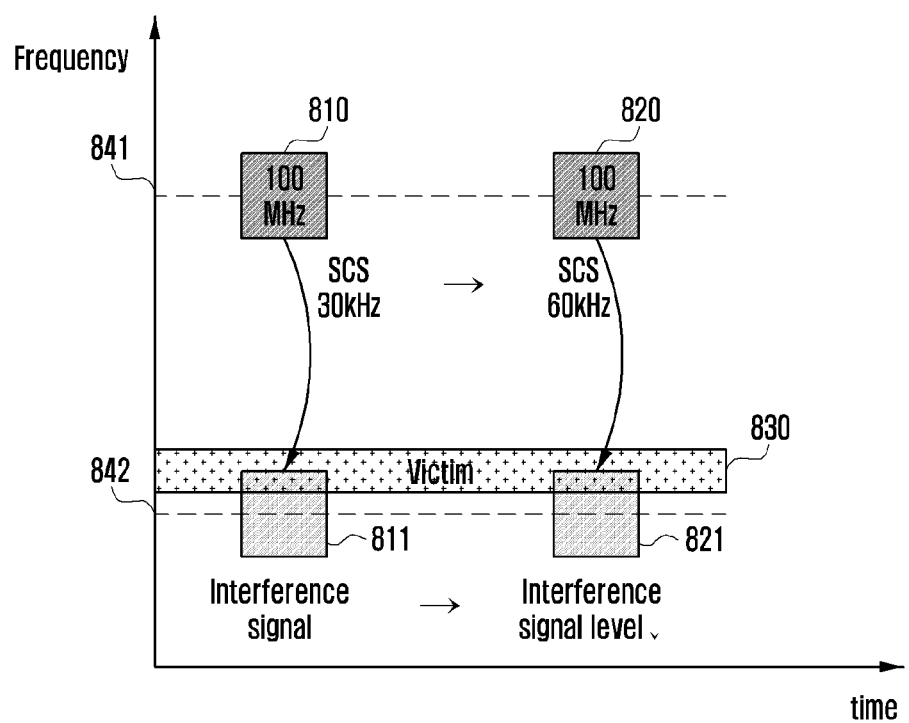
FIG. 8 is a diagram illustrating a method of changing a value of subcarrier spacing according to various embodiments.

FIG. 8 is a diagram illustrating a method of changing a value of subcarrier spacing according to various embodiments.

Referring to FIG. 8, BWP 1 810 having a first center frequency 841 is shown. A processor 120 may check the possibility of self-interference caused by the BWP 1 810 by using the frequency band information for BWP 1 810 (e.g., location, bandwidth, center frequency, subcarrier spacing or motion numerology of BWP). For example, when the BWP 1 810 is used, the first self-interference region 811 may occur at the second center frequency 842. For example, at least a portion of the first self-interference region 811 generated when the BWP 1 810 is used may be included in the downlink band 830 with the first base station (e.g., a first base station 410 of FIG. 4).

According to various embodiments, when it is determined that there is a possibility of self-interference using the BWP 1 810, the processor 120 may reduce self-interference by changing the value of the subcarrier spacing of the BWP 1 810. For example, in the case of using the BWP 1 810, if it is determined that there is a possibility of self-interference, and it is impossible to select another frequency band that can avoid self-interference, the processor 120 can reduce self-interference by changing a value of the subcarrier spacing of the BWP 1 810.

For example, the BWP 2 820 in which the subcarrier spacing value of the BWP 1 810 is changed may be used. For example, if the value of subcarrier spacing of BWP 1 810 is 30 KHz, the value of subcarrier spacing of BWP 2 820 may be 60 KHz. In the case of the BWP 2 820, a second self-interference region 821 equal to the bandwidth of the first self-interference region 811 may be generated at the second center frequency 842. However, the REFSENS value of BWP 2 820 may be smaller than the REFSENS value of BWP 1 810. The table below is an example of subcarrier spacing REFSENS values in various frequency bandwidths.

TABLE 1

| SCS (kHz) | 10 Mhz (dBM) | 15 Mhz (dBM) | 20 Mhz (dBM) | 50 Mhz (dBM) | 100 Mhz (dBM) |
| --- | --- | --- | --- | --- | --- |
| 15 | −95.8 | −94.0 | −92.7 | −88.6 | |
| 30 | −96.1 | −94.1 | −92.9 | −88.7 | −85.6 |
| 60 | −96.5 | −94.4 | −93.1 | −88.8 | −85.7 |

Referring to Table 1, it is shown that as the subcarrier spacing (SCS) value increases, the REFSENS value decreases. For example, when using an SCS of 10 MHz to 15 kHz, a REFSENS value of −95.8 dBM may be used, but when using an SCS of 60 kHz, a REFSENS value of −96.5 dBM may be used. The smaller the REFSENS value, the smoother communication can be supported. According to an embodiment, the processor 120 may perform second communication (e.g., 5G communication or pre-5G communication communication) with a second base station (e.g., the second base station 420 of FIG. 4) by using a second frequency band (e.g., BWP 1 510 in FIG. 5) and a third frequency band (e.g., BWP 2 520 in FIG. 5) having different values of subcarrier spacing through a second communication circuit (e.g., the second communication processor 214 in FIG. 2).

Figure 9:
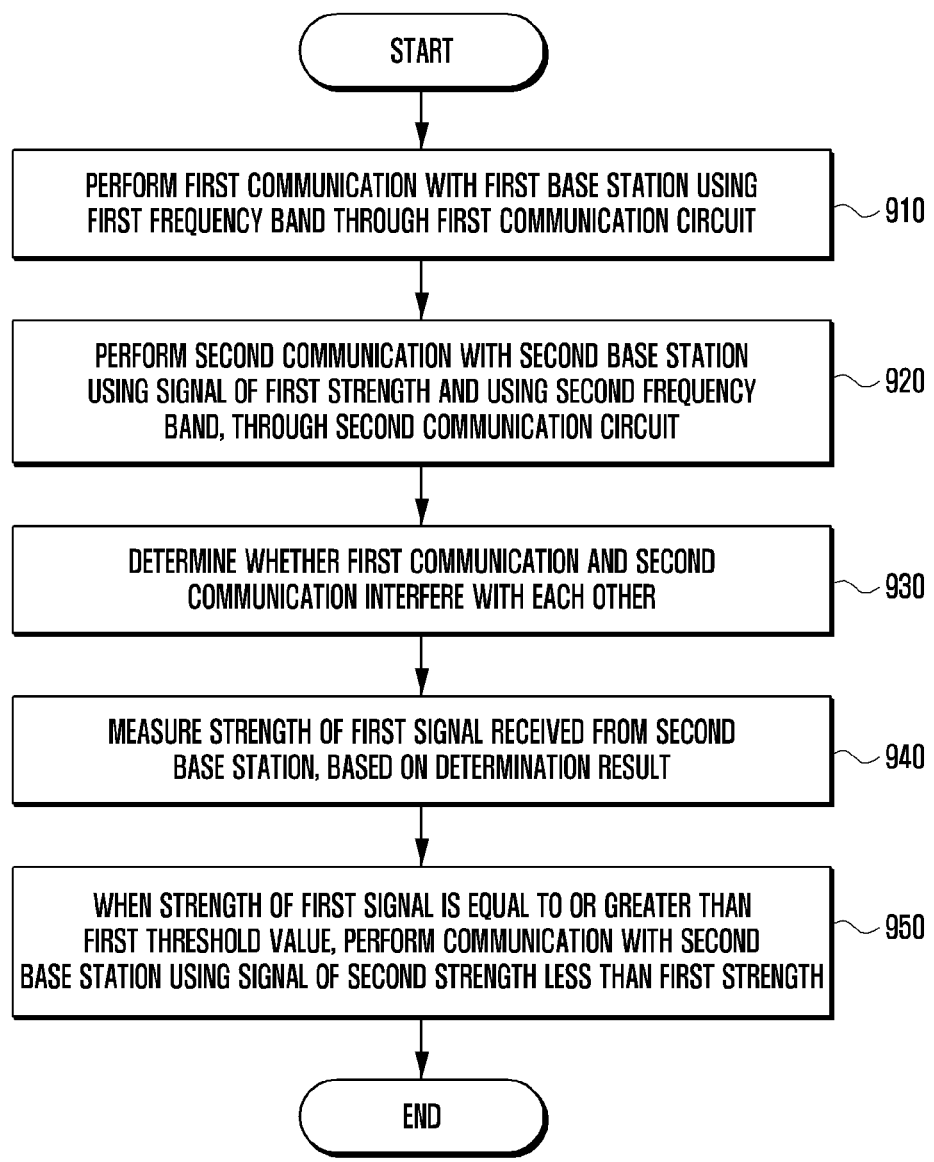
FIG. 9 is a flowchart illustrating a method of reducing self-interference due to dual uplink operation according to various embodiments.

FIG. 9 is a flowchart illustrating a method of reducing self-interference due to dual uplink operation according to various embodiments.

Referring to FIG. 9, in operation 910, the electronic device 101 (or processor 120) may perform first communication with the first base station using the first frequency band through a first communication circuit (e.g., the first communication processor 212 of FIG. 2). The first communication may include legacy communication, for example, second generation (2G) communication, 3G communication, 4G communication, or long term evolution (LTE) communication. The first frequency band may mean, for example, a designated band of about 6 GHz or less. According to an embodiment, the first frequency band may include a first downlink band and a first uplink band that are distinguished from each other. The first base station may include, for example, a legacy base station (e.g., eNB) having a large cell radius. According to an embodiment, the electronic device 101 may perform a first uplink operation of transmitting data from the electronic device 101 to a first base station using at least a portion of the first frequency band (e.g., an uplink band).

In operation 920, the electronic device 101 (or the processor 120) may perform second communication with the second base station by using a second frequency band and a signal having a first strength through a second communication circuit (e.g., the second communication processor 214 in FIG. 2). The second communication may include, for example, 5G communication or pre-5G communication. The second frequency band may mean a frequency band that is at least higher than the first frequency band, for example, a designated band of about 300 MHz to about 60 GHz. According to an embodiment, the second frequency band may be used as an area for uplink and downlink. For example, the second frequency band may include an uplink/downlink (UL/DL) band. The second base station may include, for example, an NR base station (e.g., gNB) forming a small cell radius within a cell formed by the first base station. According to an embodiment, the electronic device 101 may perform a second uplink operation of transmitting data from the electronic device 101 to the second base station using at least a portion of the second frequency band. Hereinafter, the dual uplink operation defined in various embodiments may be understood as a case in which the first uplink operation and the second uplink operation are simultaneously performed.

In operation 930, the electronic device 101 (or the processor 120) may determine whether the first communication and the second communication interfere with each other.

According to various embodiments, the processor 120 may determine the possibility of occurrence of self-interference using the first frequency band and/or the second frequency band. For example, the processor 120 estimates a self-interference zone in which harmonics and/or IMD may occur by using at least one boundary value (e.g., an upper limit value or a lower limit value) among the downlink or uplink of each of the first frequency band and/or the second frequency band, and may determine the possibility of occurrence of self-interference through the estimated self-interference region. For example, the electronic device 101 (or the processor 120) may check whether the self-interference region in the designated downlink band is included and determine the possibility of self-interference.

According to an embodiment, the processor 120 may estimate a self-interference region, based on a first frequency band and a second frequency band, check whether the difference between the center frequency domain of the first frequency band or the center frequency domain of the second frequency band and the self-interference region is within a first threshold value, and may determine whether the first communication and the second communication interfere with each other based on the result of the confirmation. The self-interference might not occur only when the self-interference region in the downlink band is included, but may also occur when the downlink region and the interference region are adjacent to each other. Accordingly, if the self-interference region and the downlink band are adjacent within a predetermined distance, it may be determined that there is a possibility of self-interference. According to an embodiment, the electronic device 101 may determine the possibility of occurrence of self-interference, based on whether a difference between the center frequency domain of the downlink and the self-interference domain is within a first threshold value.

According to an embodiment, the processor 120 may check information on a frequency domain in which self-interference may occur based on a hardware filter characteristic or the like. For example, the electronic device 101 may store information on a frequency domain in which self-interference may occur in the memory 130, and the processor 120 may check in advance a possibility of occurrence of self-interference when selecting a frequency band.

In operation 940, the electronic device 101 (or the processor 120) may measure the strength of the first signal received from the second base station based on the determination result. For example, a reference signal received power (RSRP) of a first signal received from a second base station may be measured. According to an embodiment, the processor 120 may calculate a downlink path loss (PL) or a distance to the second base station, based on the RSRP of the first signal. According to various embodiments, as a part or all of an operation for performing operation 940, as shown in operations 331 to 333 of FIG. 3B, the processor 120 may check whether the strength of the first signal received from the first base station is less than a first threshold value, and determine whether to perform operation 950 by checking whether the strength of the second signal received from the second base station is less than the second threshold value.

In operation 950, when the strength of the first signal is greater than or equal to a first threshold value, the electronic device 101 (or the processor 120) may perform communication with the second base station by using a signal having a second strength less than the first strength. For example, by lowering the signal output level, the degree of self-interference can be reduced.

According to various embodiments, the processor 120 may lower a level of a bias signal to be input to an amplifier (AMP) at the transmitting end of the second communication circuit in order to communicate with a signal of the second strength. As the signal output level is lowered, the degree of self-interference can be reduced.

According to various embodiments, the processor 120 may change at least one parameter that determines transmission power in order to communicate with a signal of a second strength. The processor 120 may induce the second base station to use the signal of the second strength by transmitting the changed parameter to the second base station. For example, the electronic device 101 may modify at least one parameter included in a power headroom report (PHR) to lower a power headroom (PH) value. The formula for determining the PH can be as follows.

$$PH_{type1,c}(i) = P_{CMAX,c}(i) - [P_{OPUSCH,c}(j) + \alpha_c(j) \cdot PL_c + f_c(i)]$$

Here, $PH_{type1,c}(i)$ may represent a Type 1 virtual PH in subframe i. $P_{CMAX,c}(i)$ may represent a value of the maximum transmission power of the cell c selected by the electronic device 101. $P_{CMAX,c}(i)$ may be a maximum terminal transmission power value arbitrarily selected by the terminal by the base station between Pcmax_H value set based on P-max, which is a value transmitted to the electronic device 101 through RRC signaling, and Pcmax_L determined in consideration of MPRs that may have various values by actual scheduling of the terminal.

$P_{OPUSCH,c}(j)$ is the sum of $P_{O-NORMINAL-PUSCH}(j)$ and $P_{O-UE-PUSCH}(j)$ for the cell (c) selected by the electronic device 101, and a value of j may be provided as 0 or 1 from an upper layer. In the case of semi-persistent grant PUSCH transmission (or retransmission), j may be 0, whereas in the case of dynamic scheduled grant PUSCH transmission (or retransmission), j may be 1, and in the case of random access response grant PUSCH transmission (or retransmission), j may be 2. If j is 0 or 1, one of values of $\alpha_c(j)$ {0,0.4,0.5, 0.6,0.7,0.8,0.9,1} may be selected by a 3-bit parameter provided from an upper layer.

$PL_c$ is a dB value of an expected downlink path loss (PL) value for the cell c selected by the electronic device 101 and may be obtained from RSRP.

$f_c(i)$ is a PUSCH power control adjustment state for the cell (c) selected by the electronic device 101, and may be calculated based on the correction value $\delta_{PUSCH}$, $\delta_{PUSCH}$ may mean a TPC command.

According to various embodiments, the electronic device 101 may modify $PL_c$ to induce the second base station to use the second strength signal. For example, in order to make the downlink path loss appear larger than the actual one, a specified constraint value may be added to $PL_c$. This is because when $PL_c$ increases according to the above equation, $PH_{type1,c}(i)$ decreases. According to an embodiment, the constraint value may be specified in advance and stored in the electronic device 101. In another embodiment, the electronic device 101 may dynamically determine the constraint value according to a situation. In further another embodiment, the network (e.g., the second base station) may directly designate a constraint value and transmit it to the electronic device 101.

According to various embodiments, the electronic device 101 may modify $P_{CMAX,c}(i)$ to induce the second base station to use the second strength signal. $P_{CMAX,c}(i)$ is determined in consideration of MPR, A-MPR, P-MPR, DTC, and the like. Like A-MPR, a method of limiting the maximum power value in a self-interference situation can be used. By limiting the size of $P_{CMAX,c}(i)$ according to the above equation, $PH_{type1,c}(i)$ may be lowered.

According to various embodiments, the electronic device 101 may determine whether the second strength is lower than a second threshold value lower than the first threshold value. As the signal strength becomes weaker, more distortion can occur. The second threshold value may be a value previously designated for smooth communication with the second base station, and the electronic device 101 may store the second threshold value.

According to various embodiments, when the second strength is lower than the second threshold value, the processor 120 may adjust modulation and coding schemes (MCSs) of the signal of the second strength. For example, a signal of the second strength may transmit a signal that is resistant to noise and/or interference by lowering the modulation level of the signal.

According to various embodiments, when the second strength is lower than the second threshold value, the processor 120 may repeatedly transmit the signal of the second strength. For example, the same signal may be repeatedly transmitted to extract an accurate signal.

According to various embodiments, a first base station (e.g., the first base station 410 of FIG. 4) and/or a second base station (e.g., the second base station 420 of FIG. 4) may perform an operation to reduce self-interference.

According to various embodiments, the first base station (e.g., the first base station 410 of FIG. 4) and/or the second base station (e.g., the second base station 420 of FIG. 4) may check the location of the electronic device 101 and adjust the single uplink and the dual uplink. The location of the electronic device 101 may be classified using a TA value assigned to the electronic device 101, and a value calculated based on a signal transmitted by the electronic device 101, for example, a downlink path loss, may be used.

When the electronic device 101 is located near the center of the cell, the first base station (e.g., the first base station 410 of FIG. 4) and/or the second base station (e.g., the second base station 420 of FIG. 4) may predict that the downlink signal strength received by the electronic device 101 is strong and the uplink transmission power of the electronic device 101 is not high. In other words, when the electronic device 101 is located near the center of the cell, it can be predicted that the electronic device 101 is relatively robust to self-interference and the size of occurrence thereof is small.

According to various embodiments, the first base station (e.g., the first base station 410 of FIG. 4) and/or the second base station (e.g., the second base station 420 of FIG. 4) may be configured to perform dual uplink transmission when the electronic device 101 is located near the cell center, and to perform single uplink transmission when the electronic device 101 is located outside the cell. In addition, according to these conditions, the base station may perform DUO by adjusting the BWP in which the terminal operates. The first base station and/or the second base station may allocate a frequency band (e.g., BWP) that has a high possibility of occurrence of inter-personal interference due to IMD or is expected to have a large influence to a terminal determined to perform a single uplink. As another example, the electronic device 101 determined to perform the dual uplink may be allocated a frequency band (e.g., BWP) where the possibility of self-interference due to IMD is relatively low, or its effect is expected to be small.

According to various embodiments, the first base station (e.g., the first base station 410 of FIG. 4) and/or the second base station (e.g., the second base station 420 of FIG. 4) may allocate an appropriate frequency band (e.g., BWP) to each electronic device 101 based on the UE capability transmitted by the electronic device 101. It is assumed that the electronic device 101 transmits a single uplink preference included in the UE capability because it is difficult to perform dual uplink due to self-interference.

According to various embodiments, the first base station (e.g., the first base station 410 of FIG. 4) and/or the second base station (e.g., the second base station 420 of FIG. 4) may pre-calculate a frequency band with a high possibility of self-interference in order to determine a frequency band (e.g., BWP) to be used by the electronic device 101. A BWP located in the frequency band where the possibility of self-interference is low may be allocated to the electronic device 101 having a preference for dual uplink in UE capability, and a BWP located in a frequency band in which self-interference is likely to occur may be allocated to the electronic device 101 having a preference for a single uplink.

According to various embodiments, the first base station (e.g., the first base station 410 of FIG. 4) and/or the second base station (e.g., the second base station 420 of FIG. 4) may consider the location of the electronic device 101 to determine a frequency band (e.g., BWP) to be used by the electronic device 101. For example, when the electronic device 101 is located near the center of the cell, since the downlink signal strength received by the electronic device 101 is strong and the uplink transmission power of the electronic device 101 will not be high, it is predictable that it is relatively robust to self-interference and its occurrence size will be small. Thus, in an embodiment, when the electronic device 101 is located near the center of the cell, the first base station (e.g., the first base station 410 of FIG. 4) and/or the second base station (e.g., the second base station 420 of FIG. 4) may allocate a BWP located in a frequency band where the possibility of self-interference due to harmonics is high or the effect is expected to be large. In another embodiment, when it is determined that the electronic device 101 is located outside the cell, the first base station (e.g., the first base station 410 of FIG. 4) and/or the second base station (e.g., the second base station 420 of FIG. 4) may allocate to the electronic device 101 a BWP located in a frequency band where the possibility of occurrence of self-interference due to harmonics is relatively low, or the effect thereof is expected to be small.

Figure 10A:
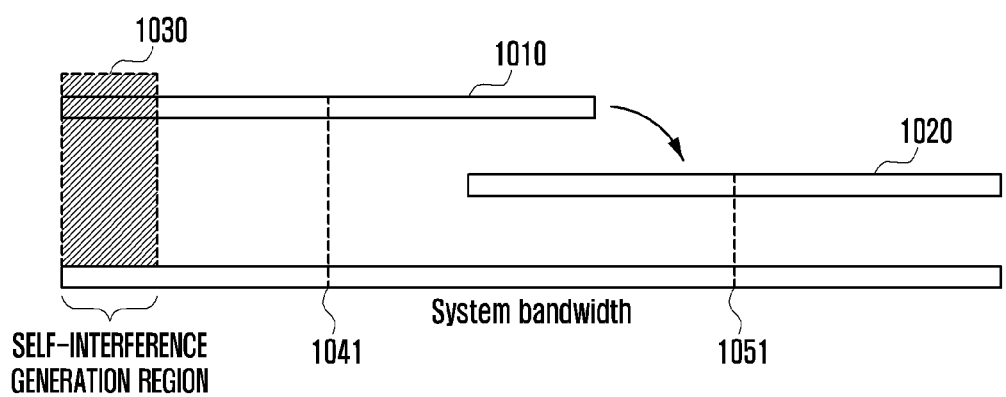
FIGS. 10A to 10C are diagrams illustrating a method of reducing self-interference due to dual uplink operation in a first base station and/or a second base station according to various embodiments.
Figure 10B:
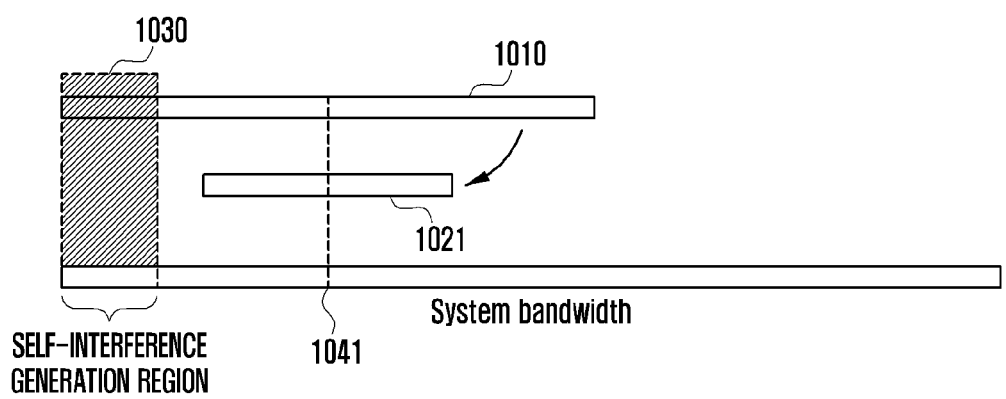
Figure 10C:
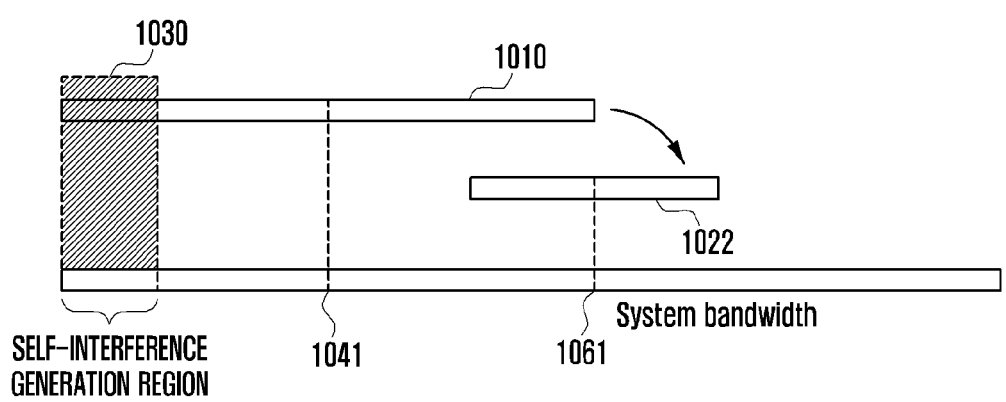

FIGS. 10A to 10C are diagrams illustrating a method of reducing self-interference due to dual uplink operation in a first base station and/or a second base station according to various embodiments.

Referring to FIG. 10A, a first base station (e.g., the first base station 410 of FIG. 4) and/or a second base station (e.g., the second base station 420 of FIG. 4) may select another frequency band with a different center frequency.

According to an embodiment, the first base station and/or the second base station may set BWP 1 1010 (e.g., BWP 1 510 of FIG. 5) having a first center frequency 1041 (e.g., the first center frequency 541 of FIG. 5) defined within the system bandwidth and BWP 2 1020 (e.g., BWP 2 520 in FIG. 5) having a second center frequency 1051 (e.g., the second center frequency 551 in FIG. 5) in the electronic device 101. For example, a first self-interference region (e.g., the first self-interference region 511 in FIG. 5) by BWP 1 1010 and a second self-interference region by BWP 2 1020 (e.g., the second self-interference region 521 in FIG. 5) occur with different center frequencies, but the second self-interference region may avoid the self-interference generation region 1030.

The first base station and/or the second base station may determine that the possibility of self-interference caused by BWP 2 is lower than that of self-interference by BWP 1 1010, and select the BWP 2 1020 to perform second communication.

Referring to FIG. 10B, the first base station (e.g., the first base station 410 of FIG. 4) and/or the second base station (e.g., the second base station 420 of FIG. 4) may select another frequency band having the same center frequency.

According to an embodiment, the first base station and/or the second base station may set BWP 1 1010 (e.g., the BWP 1 510 of FIG. 6) having a first center frequency 1041 (e.g., the first center frequency 641 of FIG. 6) defined within the system bandwidth and BWP 2 1021 having the first center frequency 1041 in the electronic device 101. For example, a first self-interference region (e.g., the first self-interference region 611 in FIG. 6) by BWP 1 1010 and a second self-interference region by BWP 2 1021 (e.g., the second self-interference region 621 in FIG. 6) occur with the same center frequency, but the second self-interference region avoids the self-interference generation region 1030. The first base station and/or the second base station may determine that the possibility of self-interference caused by BWP 2 1021 is lower than that of self-interference by BWP 1 1010, and select the BWP 2 1021 to perform second communication.

Referring to FIG. 10C, the first base station (e.g., the first base station 410 of FIG. 4) and/or the second base station (e.g., the second base station 420 of FIG. 4) may select another frequency band having a different center frequency and a reduced bandwidth.

According to an embodiment, the first base station and/or the second base station may set BWP 1 1010 (e.g., BWP 1 710 in FIG. 7) having a first center frequency 1041 (e.g., the first center frequency 741 of FIG. 7) defined within the system bandwidth (system bandwidth) and BWP 2 1022 having a second center frequency 1061 (e.g., the second center frequency 751 in FIG. 7) and having a bandwidth smaller than BWP 1 (e.g., BWP 2 720 in FIG. 7) in an electronic device 101. For example, a first self-interference region (e.g., the first self-interference region 711 in FIG. 7) by BWP 1 1010 and a second self-interference region by BWP 2 1022 (e.g., the second self-interference region 721 in FIG. 7) may have different center frequencies and sizes, and the second self-interference region may avoid the self-interference generating region 1030.

The first base station and/or the second base station may determine that the possibility of occurrence of self-interference by BWP 2 1022 is lower than the possibility of occurrence of self-interference by BWP 1 1010, and may select the BWP 2 1022 to perform the second communication.

Figure 11:
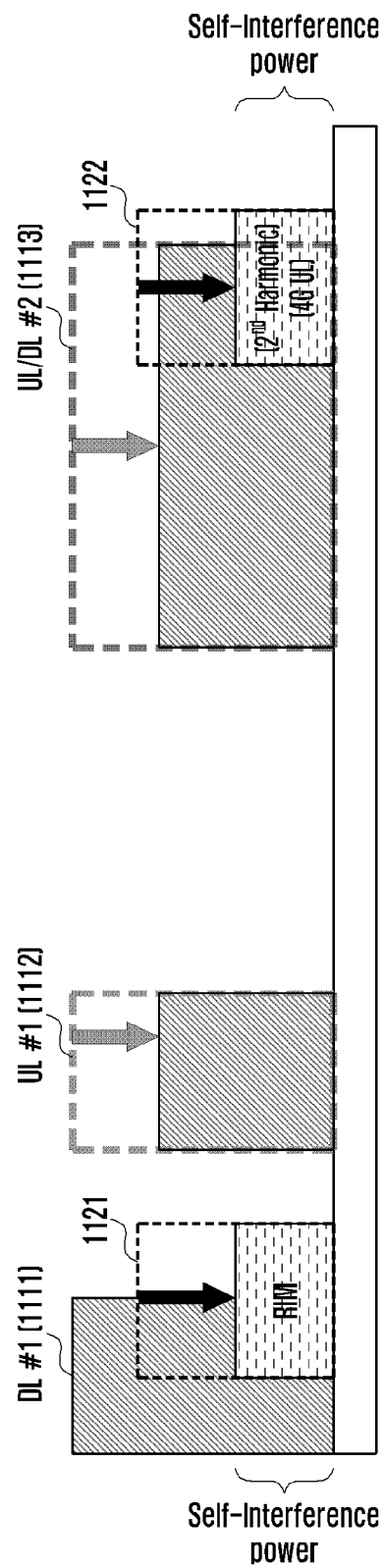
FIG. 11 is a diagram illustrating a case in which the strength of a signal is adjusted according to various embodiments.

FIG. 11 is a diagram illustrating a case in which the strength of a signal is adjusted according to various embodiments.

Referring to FIG. 11, an electronic device 101 may support communication through a first frequency band including the downlink band 1111 and the uplink band 1112 and a second frequency band including the uplink/downlink band 1113.

According to various embodiments, the electronic device 101 may estimate a self-interference region due to a combination of the sum and difference of the boundary value of the uplink/downlink band 1113 and the boundary value of the uplink band 1112. For example, when at least a portion of the first self-interference region 1121 in the downlink band 1111 is included, it may be determined that self-interference occurs.

According to various embodiments, the electronic device 101 may check whether a multiple frequency band of the uplink band 1112 is included in the uplink/downlink (UL/DL) band 1113 to estimate the self-interference region. For example, when at least a portion of the second self-interference region 1122 in the uplink/downlink (UL/DL) band 1113 is included, it may be determined that self-interference occurs.

According to various embodiments, the processor 120 may control a first communication circuit (e.g., the first communication processor 212 of FIG. 2) and a second communication circuit (e.g., the second communication processor 214 of FIG. 2) to reduce the strength of the first uplink signal using the uplink band 1112 and/or the strength of the second uplink signal using the uplink/downlink band 1113. As the signal output level is lowered, the degree of self-interference can be reduced. For example, the power of the first self-interfering region 1121 and/or the second self-interfering region 1122 may be lowered.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. The electronic device according to embodiments of the disclosure is not limited to those described above.

It should be appreciated that various embodiments of the disclosure and the terms used therein are not intended to limit the technological features set forth herein to particular embodiments and include various changes, equivalents, and/or alternatives for a corresponding embodiment. With regard to the description of the drawings, similar reference numerals may be used to designate similar or relevant elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "a first", "a second", "the first", and "the second" may be used to simply distinguish a corresponding element from another, and does not limit the elements in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may be interchangeably used with other terms, for example, "logic," "logic block," "component," or "circuit". The "module" may be a minimum unit of a single integrated component adapted to perform one or more functions, or a part thereof. For example, according to an embodiment, the "module" may be implemented in the form of an application-specific integrated circuit (ASIC).

Various embodiments as set forth herein may be implemented as software (e.g., the program 140) including one or more instructions that are stored in a storage medium (e.g., the internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each element (e.g., a module or a program) of the above-described elements may include a single entity or multiple entities. According to various embodiments, one or more of the above-described elements may be omitted, or one or more other elements may be added. Alternatively or additionally, a plurality of elements (e.g., modules or programs) may be integrated into a single element. In such a case, according to various embodiments, the integrated element may still perform one or more functions of each of the plurality of elements in the same or similar manner as they are performed by a corresponding one of the plurality of elements before the integration. According to various embodiments, operations performed by the module, the program, or another element may be carried out sequentially, in parallel, repeatedly, or heuristically, or one or more of the operations may be executed in a different order or omitted, or one or more other operations may be added.

The invention claimed is:

1. An electronic device comprising:
a first communication circuit configured to provide first wireless communication;
a second communication circuit configured to provide second wireless communication;
a processor operatively connected to the first communication circuit and the second communication circuit; and
a memory operatively connected to the processor,
wherein the memory stores instructions that cause, when executed, the processor to:
perform first communication with a first base station using a first frequency band through the first communication circuit;
perform second communication with a second base station using a second frequency band through the second communication circuit;
determine whether the first communication and the second communication cause interference with each other;
receive at least one piece of frequency band information from the first base station or the second base station while the processor performs second communication with a second base station using a second frequency band through the second communication circuit;
select a third frequency band, based on the at least one piece of frequency band information;
generate a RACH preamble, based on a random access channel (RACH) configuration associated with the third frequency band based on the selected third frequency band; and
transmit, to the second base station for the second communication, a request by transmitting the RACH,
wherein the third frequency band is different from the second frequency band in at least one of a bandwidth, a center frequency, or a sub-carrier spacing (SCS).

2. The electronic device of claim 1, wherein the frequency band information comprises at least one of a bandwidth of a third frequency band, a center frequency, or sub-carrier spacing information.

3. The electronic device of claim 1, wherein the instructions cause the processor to estimate a self-interference region, based on the first frequency band and the second frequency band, in order to determine whether the first communication and the second communication cause interference with each other.

4. The electronic device of claim 3, wherein the instructions cause the processor to:
determine whether a difference between the center frequency domain of the first frequency band or the center frequency domain of the second frequency band and the self-interference domain is within a first threshold value; and
determine whether the first communication and the second communication cause interference with each other, based on the determination.

5. The electronic device of claim 3, wherein the instructions cause the processor to select the third frequency band having the same bandwidth as the second frequency band and having a different center frequency, based on the at least one piece of frequency band information.

6. The electronic device of claim 3, wherein the instructions cause the processor to select the third frequency band having the same center frequency as the second frequency band and having a different bandwidth, based on the at least one piece of frequency band information.

7. The electronic device of claim 3, wherein the instructions cause the processor to select the third frequency band having a different center frequency and bandwidth from the second frequency band, based on the at least one piece of frequency band information.

8. The electronic device of claim 3, wherein the instructions cause the processor to select the third frequency band having the same center frequency and bandwidth as the second frequency band but having a different sub-carrier spacing value, based on the at least one piece of frequency band information.

9. The electronic device of claim 1, wherein the instructions cause the processor to:
measure the strength of a first signal received from the second base station, based on the determination result; and
perform communication with the second base station using a signal of a second strength that is smaller than the first strength when the strength of the first signal is greater than or equal to a first threshold.

10. The electronic device of claim 9, wherein the instructions cause the processor to adjust the level of a bias signal to be input to an amplifier (AMP) at the transmitting end of the second communication circuit in order to use the signal of the second strength.

11. The electronic device of claim 9, wherein the instructions cause the processor to modify at least one parameter that determines the transmission power in order to use the signal of the second strength.

12. A method of reducing self-interference due to a dual uplink operation, the method comprising:
   performing first communication with a first base station using a first frequency band through a first communication circuit;
   performing second communication with a second base station using a second frequency band through a second communication circuit;
   determining whether the first communication and the second communication cause interference with each other;
   receiving at least one piece of frequency band information from the first base station or the second base station while the processor performs second communication with a second base station using a second frequency band through the second communication circuit;
   selecting a third frequency band, based on the at least one piece of frequency band information;
   generating a RACH preamble, based on a random access channel (RACH) configuration associated with the third frequency band based on the selected third frequency band; and
   transmitting a request by transmitting the RACH to the second base station for the second communication,
   wherein the third frequency band different from the second frequency band in at least one of a bandwidth, a center frequency, or a sub-carrier spacing (SCS).

* * * * *